United States Patent
Fischer

(10) Patent No.: US 10,719,674 B2
(45) Date of Patent: Jul. 21, 2020

(54) SCALABLE ASSET LOCATION AND TRACKING AND SENSOR MONITORING SYSTEM

(71) Applicant: Jeffrey Fischer, Boston, MA (US)

(72) Inventor: Jeffrey Fischer, Boston, MA (US)

( * ) Notice: Subject to any disclaimer, the term of this patent is extended or adjusted under 35 U.S.C. 154(b) by 253 days.

(21) Appl. No.: 15/292,903

(22) Filed: Oct. 13, 2016

(65) Prior Publication Data

US 2018/0137316 A1 May 17, 2018

Related U.S. Application Data

(60) Provisional application No. 62/257,232, filed on Nov. 19, 2015.

(51) Int. Cl.
G06K 7/10 (2006.01)
G06K 19/07 (2006.01)
G06Q 50/00 (2012.01)

(52) U.S. Cl.
CPC ....... *G06K 7/10366* (2013.01); *G06K 19/071* (2013.01); *G06K 19/0723* (2013.01); *G06Q 50/01* (2013.01)

(58) Field of Classification Search
CPC . G06K 7/10366; G06K 19/0723; G06Q 50/01
See application file for complete search history.

(56) References Cited

U.S. PATENT DOCUMENTS

| | | | |
|---|---|---|---|
| 6,353,406 B1 | 3/2002 | Lanzl | |
| 6,963,289 B2 | 11/2005 | Aljadeff | |
| 7,148,803 B2 | 12/2006 | Bandy | |
| 7,518,502 B2 | 4/2009 | Austin | |
| 8,174,383 B1* | 5/2012 | Chung | G08B 13/2462 340/539.1 |
| 8,918,075 B2 | 12/2014 | Maier | |
| 9,357,348 B2 | 5/2016 | Evans | |
| 2007/0171047 A1 | 7/2007 | Goodman | |
| 2007/0210923 A1 | 9/2007 | Butler | |
| 2008/0100423 A1* | 5/2008 | Geissler | G06K 19/0707 340/10.1 |
| 2008/0229103 A1 | 9/2008 | Mutka | |
| 2011/0029359 A1 | 2/2011 | Roeding | |
| 2011/0316674 A1* | 12/2011 | Joy | G06Q 10/087 340/10.1 |
| 2013/0006697 A1* | 1/2013 | Bhaskar | G06Q 10/08 705/7.27 |

\* cited by examiner

*Primary Examiner* — Laura A Gudorf

(57) ABSTRACT

A scalable tag detection, location, tracking, recovery, and data collection system uses a social network of mobile devices, such as smartphones, as readers, to find lost or stolen goods that are tagged, or to read data or sensor values from tags at remote locations. A network service apparatus compiles IDs of tags of interest into a data structure representing a subset of all tagged items, and transmits the data structure information to the participating mobile devices. Each mobile device application can receive tag transmissions when in proximity to any tag. The mobile device processes received tags with the filter to determine if they are part of the composition of the data structure and thus a tag of interest. If so, the mobile device location, time, and tag ID, are relayed to the network service for additional analysis. The short range tag emits a low power, low duty factor signal.

18 Claims, 14 Drawing Sheets

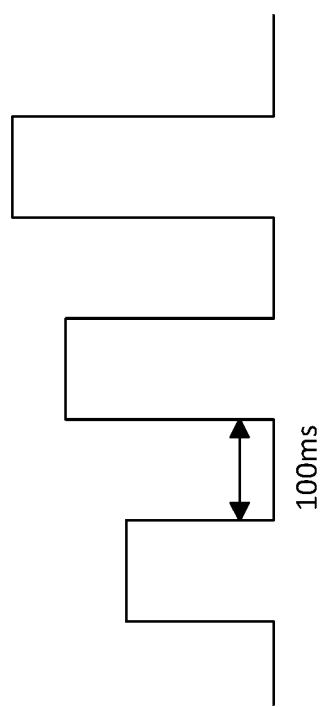
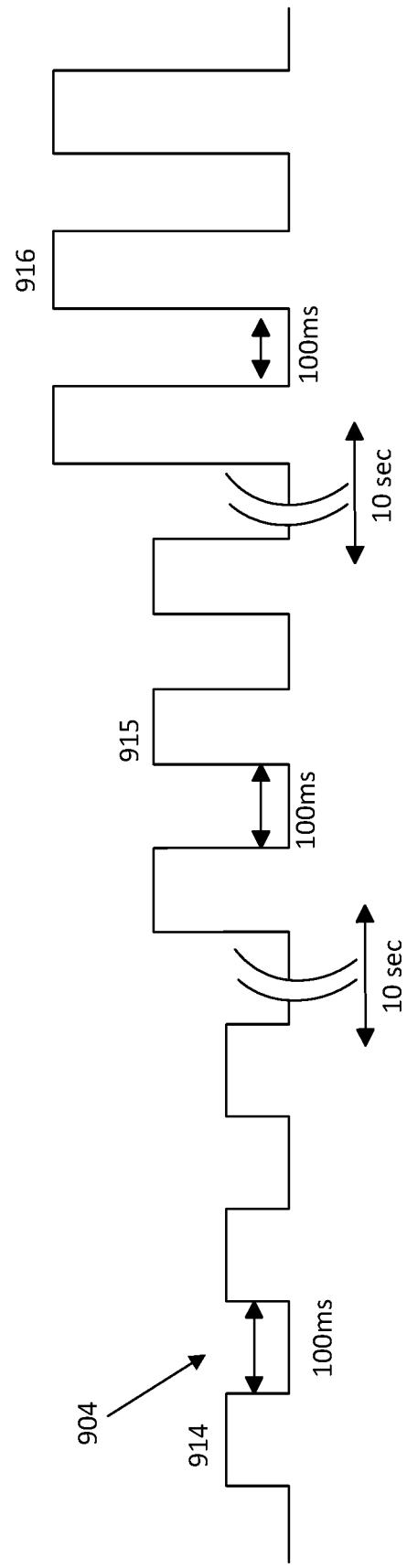
FIG. 9A
FIG. 9B

SCALABLE ASSET LOCATION AND TRACKING AND SENSOR MONITORING SYSTEM

CROSS REFERENCE TO RELATED APPLICATIONS

This application claims the benefit of and priority of U.S. Provisional application No. 62/257,232 titled "Social Network for Asset Tracking and Sensor Monitoring" filed Nov. 19, 2015, which is hereby incorporated by reference in its entirety.

STATEMENT REGARDING FEDERALLY SPONSORED RESEARCH

No part of this work was performed under federally sponsored research

BACKGROUND OF THE INVENTION

1. Field of the Invention

This invention relates generally to a scalable solution to identity tagging that makes use of social networks of readers, whereby a large number of items around the world are expected to be tagged with very low power tags that emit a signal and are detected only at close range by an arbitrary mobile device such as a smartphone or tablet, and the mobile device reports its detection to the social network using the application apparatus running on it. An information compression technique allows a large number of possible tags to be hunted simultaneously with a large number of socially networked mobile devices, among a population of an even larger number of operating tags. Priority is claimed to U.S. Provisional application No. 62/257,232 titled "Social Network for Asset Tracking and Sensor Monitoring" filed Nov. 19, 2015, which is incorporated by reference in its entirety.

2. Related Art

The loss of important possessions, whether accidental or through theft, is a significant problem in many people's lives. In particular, theft is the source of many other crimes as well. According to FBI statistics, there were over 8 Million property crimes in the US in 2014, i.e. crimes of theft. Theft feeds other crimes as it supports the purchase of street drugs, supports terrorist rings, and often results in violent crimes. The FBI statistics also report that 28% of violent crime reports in the US in 2014 were a result of robberies.

An embodiment of the present invention is a solution to such property crime both after the fact and as a deterrent once it is in use extensively. The use of the present invention will also aid in the identification and capture of criminals associated with theft anywhere in the world, no matter where the property was stolen from. It will facilitate the recovery of stolen property, and create an improvement of the general well-being of society. The frustration at being unsuccessful can ultimately lead to attrition of the act in the first place. U.S. Provisional application No. 62/257,232 titled "Social Network for Asset Tracking and Sensor Monitoring" filed Nov. 19, 2015, is incorporated by reference in its entirety.

"Asset tracking" is well known in the art for use in anti-theft and inventory tracking of items, using radio frequency identification (RFID) of various technologies and detectors, often at the portal of the asset's location, such as dock door readers in warehouses or the doors of retail establishments. The items are the assets. The tracking mechanism usually starts with placing a "tag" on the asset, with the tag being part of a radio-frequency-based system that interrogates the tag at a distance. One typical form in the prior art is a tag that contains a high frequency (HF) circuit that is resonant at about 14 MHz, and as it passes through a set of upright terminals, the tag triggers an alarm (e.g. "RFID Handbook", Finkenzeller, K., Wiley & Sons). This type of system is often seen in retail stores (e.g. "NFC in cell phones: the new paradigm for an interactive world", Fischer, J. IEEE Communications Magazine•June 2009). Another type of tag is a Wi-Fi tag that interacts with IEEE 802.11 access points in an enterprise business. The business owner might tag computers or other equipment, and the Wi-Fi system tracks the Wi-Fi tag by triangulating on its received power level or time of arrival information. Yet another type of system is based on UHF radio signal backscatter which can interrogate a tag at nominally up to 15-20 meters (e.g. "An In-Depth User's Guide to Selecting and Deploying Gen2 Tags, Readers, and Infrastructure" Fischer, J. 2005). These systems are often used for supply chain management. Unfortunately, there are limitations with all types of prior art systems. The biggest problem with asset tracking systems is that once the tag leaves the controlled space that the enterprise owns, it is beyond the detection capability of the system and cannot be found. The tags travel with the asset, but the readers are stuck in the enterprise.

An example of prior art for reading asset or sensor tags is shown in FIG. 1. The tags can react to being in proximity to a reader. This is typical of passive tags that are energized from the RF field of the reader (e.g. UHF Gen2 standard www.gs1.org/epcrfid/epc-rfid-uhf-air-interface-protocol/2-0-1 and ISO/IEC 14443-4:2008 Identification cards—Contactless integrated circuit cards—Proximity cards—Part 4: Transmission protocol) or field triggered active tags such as those that use the Dash 7 standard. Each tag is alternately interrogated or they may emit periodically at low periodicity. In this prior art example, reader 122 emits RF signal 124 from antenna 123 and in the process energizes and selects tag 112, which responds, either with a backscatter modulation or an internally generated RF signal 125. The response is received by reader 122 and passed from reader 122 over a wired or wireless private network connection 126 to the private network 127, which ultimately connects the reader to read monitor 129 over wired or wireless network 128. This system is not scalable like the present invention is because expanding the space over which tags can be read means adding more dedicated readers, programming these readers, provisioning and designating the readers for this purpose, and deploying the readers in a way that they are coordinated precisely with the originator of the read requirement. This system also cannot scale to search for any of an arbitrarily large number of specific tags, and cannot scale to arbitrary worldwide deployment.

Another form of prior art, for example, as described in U.S. Pat. No. 9,357,348 by Farley, is a litany of low energy Bluetooth tracking tags that have recently emerged with the low energy Bluetooth standard. These tags receive from or transmit to a cell phone. The user must activate one one of the devices for the interaction to occur. Either the user initiates a call to the tag from the cell phone or the user with a tag in their possession can press a button on the tag and the cell phone will beep. One problem with this approach is that it requires two-way communication and thus a receiver must always be operating, and therefore they require a battery just to operate. It also requires a protocol stack operating in the tag to control the interaction. A community mode is available whereby the address of the tag one is looking for is transmitted out to all the devices running the application and that device will recognize a tag with that address. To do so, either the phone must emit a beacon when looking for a tag or the tags must always emit a beacon, whether or not the tag is being searched for. Because the communication is two way, the receiver of the tag must always be able to capture the phone transmission. Another important problem with the prior art is that it is not scalable. If there are a billion tags missing, a billion addresses must be transmitted to every phone that is participating (perhaps multiple billions), and every time a tag interaction occurs, each phone must compare the address to the billion addresses stored on it. The phone storage and computation makes this process unwieldy.

Longer range high power readers and tags can be made to cover larger areas per reader, but with longer range comes higher absolute error in the location measurement due to multipath. If a time of arrival measurement is performed, the line of sight is more likely blocked at longer range inhibiting measurement of the earliest arriving signal. Similarly, the signal power versus range fluctuates dramatically between a single transmit and receive antenna. More transmit power translates into longer RF range. However, a 10 dB error in signal strength due to multipath translates into a factor of 3 in line of sight range, which at a range of 100 m can put the estimate at 300 m; being off by 10 dB at 1000 m can put the estimate at 3000 m. It has been shown that as range increases, the variance in power measurement increases (e.g. "Wireless Communications, Principles and Practice" Rappaport, T. S., 1996 $2^{nd}$ ed.). Various diversity techniques and the use of calibration tag techniques are used to reduce these effects, but at long range, the problem becomes futile in many common environments when using small, low power tags.

Also, there will always be a range versus tag-RF-power trade-off and if a tag can be read at greater range it will necessarily require more energizing power, whether that power is derived from the RF field as in "passive RFID[3]" or from battery power as in active tags.

Even Wi-Fi tags have a limited set of locations they can be detected in. A Wi-Fi tag may interact with any Wi-Fi access point, but in general, this requires tags that have to be part of an enterprise system to be found and once beyond the enterprise, cannot interact with arbitrary Wi-Fi systems. Also, the Wi-Fi tag must operate a full Wi-Fi protocol to interact with an access point and this requires excessive supply power to work.

Active and passive tagging is often used on wildlife to track animals or perform data gathering. But again, specialized readers require proximity, or active transmitters must be used at long range with limited location resolution.

Systems that try to locate a network device by the IP address cannot perform accurate location determination because the IP address gets mapped to very gross scale locations and cannot do a good job of pinpointing a device location. This technique also requires an IP connected device to do so, relegating this approach to devices other than the lowest-cost lowest-power tags.

A mobile phone can be found using a remote location mechanism, but this requires that the phone use its GPS to locate itself, and once again, this technique can only be used by full mobile devices and not low-cost low-power tags.

A system that can find arbitrarily located low-cost, low-power tags anywhere in the world are not available with prior art technology. The present invention is a solution to this problem. Once solved, property theft is largely thwarted as the stolen property can be tracked and recovered, and in many cases, the perpetrators captured by law enforcement authorities. The inability for criminals to be successful will result in greatly reduced attempts at property theft.

The system takes advantage of a community of users integrated into a social network of readers. A social network, for purposes of the present invention, is produced when a set of interdependencies are developed between entities that are independently controlled by different people, and are interconnected in a way that one entity can forward or retrieve information from at least one other entity. The searching for a tag ID somewhere in the world that is cooperatively accomplished by different people, who might not have any other connection with each other, and their downloading the application on their mobile devices and participating in the search, is the criteria for the formation of the social network used for security and information gathering in the present invention.

It is also necessary in some cases to find and/or track classes of assets such as guns or munitions. The tracking, reading and data acquisition of ID tags, class tags, or recording tags can be useful in anti-terrorism operations. Once a tag can be found (i.e. located), a tracking and/or recovery capability which continually updates the tag location may be layered upon this fundamental capability as a higher level function in software.

Besides the problem of locating/tracking assets, it is also often necessary to monitor the behavior of something remotely. An example is to monitor the temperature of food or of an experiment, or even to record an audio clip, photo, or video snapshot, or the status from human or animal bodies such as heart rate. Sensors are circuits attached to or within the tag circuitry that can determine information from the environment and either store it in some form for relaying later or relay it immediately. A simple sensor would be a biased diode to monitor temperature based on its current. A more complex sensor would be a video capture device. A tag that contains an appropriate sensor can capture the above behaviors. However, similar in nature to the asset tracking problem, it may be necessary to do this where it is not convenient for the owner of the tag to have a reader installed.

Audio or video recordings can be used for surreptitious observation and evidence gathering because the nature of the low power small size tag is that it can readily be obscured. The tag can be recording and storing, and when a mobile device that is part of the social network is nearby, it can receive the data from the tag. The tag can be emitting the data asynchronously or can be interrogated by the mobile device for the data if it can receive a signal from an enabled mobile device.

The tag may be in an arbitrary place when the monitoring takes place. A low-cost low-power tag would be needed for this as well if one were to monitor an inexpensive case of food items, for example, for a time course of temperature or temperature threshold crossing.

Any portable or fixed device may act as the mobile device which has the main attribute that it is part of a network of devices. For purposes of this specification the terms portable device and mobile device will be interchangeable and will also include "nomadic" devices, which are portable in that they can readily be moved, but are generally in a fixed position when used. An example of a fixed device would be a desktop computer. Examples of a mobile or portable device would be a cell phone, smartphone, tablet PC, convertible or combination PC, eReader, smart remote control, or laptop computer, recognizing that as technology advances, other forms of similar computing devices can serve the fundamental purpose described herein.

As use of the rich-featured networking and location services grow, it may become necessary to make a request for information about or access to a service or feature in a specific geographic location. While advertisements of such features that are available on a consistent basis may be found through the use of a search engine, short term availability is too dynamic to register with a search engine. An ability to request for notification when a dynamic feature or service is available, and remote access to such a feature or service needs to be provided. A scalable system to request such notification and access is required so that large numbers of people can be simultaneously requesting such capability in many locations throughout the network. A user would request a notification from their mobile device, and any other user on the social network in proximity of the service available would relay that information back to the user.

BRIEF SUMMARY OF THE INVENTION

The following summary of the objects of the invention is included in order to provide a basic understanding of some aspects and features of the invention. This summary is not an extensive overview of the invention and as such it is not intended to limit the identification of all key or critical elements of the invention or to delineate the scope of the invention. Its sole purpose is to present some concepts of the invention in a simplified form as a prelude to the more detailed description that is presented below.

An object of the present invention is to provide a social network where information can be pushed out to the mobile devices participating in the network from the party interested in the tag so that those network devices can be used to search for a tag, relay the tag ID and location of the reading device to a server for verification, and then the server can report the found tag if verified.

Another object of the present invention is a mobile device comprising an application that is configured to receive a first group identification data-structure from the network, and is configured to receive a first tag identification value, and determine if said first tag identification value is contained in said first group identification data-structure.

Another object of the present invention is to create a scalable system for identifying, reading, and locating tags that are in a remote location, using a mobile network, such as the 3G, 4G, or 5G LTE data networks, as the means to connect a mobile device, such as a cell phone. The mobile device can detect a tag transmission (for example, a low power, low data rate, Wi-Fi beacon), receive and read the tag information from the transmission, and the mobile device determining its own location approximately when the tag detection occurred, the mobile device relaying that information into the mobile network through its connection to a cell tower, Wi-Fi access point, or Wi-Fi assisted LTE, pass the tag information to a server for confirmation of its identity, and report the information to the party interested in the tag.

Another object of the present invention is to create a scalable reader network whereby a reader is a mobile device that is made aware of which tags it is specifically looking for, whereby the reader pre-filters the tag identification (ID) numbers, and if the tag passes the pre-filter in the mobile device it transmits the tag identity information and location over the network to a server for verifying the identity.

Another object of the present invention is that the filter is based on a combination of tag numbers into a single number and the reader would filter a single tag ID using one or more mathematical operations between the tag ID being filtered and the combined filter number.

Another object of the present invention is that multiple filters would be used in the mobile reader prior to transmitting the tag identification information to the server for final verification.

Another object of the present invention is for the server that receives the report from the mobile device to propagate the report, once the report and tag ID has been verified, to allow action to be taken, either by authorities, or by a party responsible for acting on the information from or about the tag.

Another object of the present invention is to request notification of and access to a dynamically available service or feature within a specific remote geographic location by requesting the service or feature through the network by referencing it and referencing the location of interest; the reference being processed by the server, being pushed out to the participating mobile devices as part of their filter, and the mobile devices recognizing when such service or feature is available and that the geographic location matches to within a specified boundary, and notifying the requester through the network after the match is verified by the server.

Another object of the present invention is to create a tag that can be made low power enough that it can be made so small as to be inconspicuous, operate for years on a tiny battery, or operate on harvested environmental energy, yet still be detected when in proximity to a mobile devices anywhere in the world, and in some cases act as a source of sensor or recorded information.

Another object of the present invention is to make a low-cost, low-power, and low-profile tag that can be attached to, or be part of, everyday items, such as watches, eyeglasses, second mobile devices (which need to be found when they are turned off, the battery has died, or after the sim card is removed), television sets, briefcases, wallets, jewelry, small firearms, pieces of weaponry, boxes of ammunition, individual pieces of ammunition, concealed weapons, files, car keys, credit cards and other personal items, such that these items can be located and ultimately be retrieved from a great distance away.

Another object of the present invention is to be able to detect and/or record data about events that occur within proximity to a tag, such as a hit and run incident where a tag on the car receives data based on the relation to a vibration sensor in the victim's car or mobile device.

Another object of the present invention is to use an Internet of Things connected device as a tag which would make its presence known to the mobile device through a simple low power transmission.

Another object of the present invention is an apparatus that allows the creation of a social network of mobile tag readers that is so ubiquitously dispersed as to allow the tags to use only minimal energy for transmission of RF packets and yet still be detectable and readable because the distance to a tag reader is likely to be short. emit RF packets so that they can be identified and the information transferred, but these can be at low duty factor and low transmit RF power to minimize the amount of energy required yet still be located because the distance to the ubiquitous set of possible readers that receive the signal is short.

Another object of the present invention is that an embodiment of low power tags may be made which only transmit and do not receive, or only transmit after detecting the presence of environmental RF energy, indicating a mobile device may be present to receive its RF transmission.

Another object of the present invention is that the transmit timing of a tag operating off of harvested energy is a self-regulating function that would occur when the tag has harvested sufficient energy.

Another object of the present invention is that the tag harvests energy from nearby cell phones.

Another object of the present invention is that the RF transmission from the tags is stepped in power for different transmission periods and that the relative or absolute power is noted in the data packet so that a reader can estimate its relative distance to the tag.

Another object of the present invention is that the mobile device determines information to help determine the separation in time or space between when the tag read happened and when the location information was determined.

Another object of the present invention is that the network is the cell phone network with access by mobile devices such as cell phones, smart phones, tablets, and laptops, and where the communications access to the network is either through one of the cell phone technologies (e.g. 3G, 4G, LTE, 5G, etc.) or Wi-Fi.

Another object of the present invention is that the network is the Internet, with access by mobile devices such as cell phones, smart phones, tablets, and laptops, and where the communications access is through Wi-Fi or other WLAN technology.

Another object of the present invention is that the server communicates to the mobile device that reported a tag the results of the verification whereby the tag reacts to the determination that the identification number has been verified.

Another object of the present invention is that the server may send a hold command to the mobile device to prevent continued reporting of that tag ID for a period of time or until it has changed location by a specified amount, or until the server releases the hold on that mobile device reporting that tag ID.

Another object of the present invention is an application that lets a user set a geographic boundary for a tag, and keep that tag on a watch list, such that if that tag is found by a mobile device in a location that is either inside or outside of the geographic boundary, an alarm is tripped and, or, an alert is sent.

Another object of the present invention is to gather data on items or animals that can be tagged and tracked.

Another object of the present invention is to harvest energy sufficient to effect the start of a process by determining the rate of charge from the harvesting environment and using that rate to determine a delay that will compensate the charge rate variation so that the end of the delay period has reduced variation in period.

BRIEF DESCRIPTIONS OF THE DRAWINGS

FIG. 9A shows another exemplary embodiment of what might be transmitted from a tag to assist in identifying the location of the tag whereby the power changes with each transmission.

FIG. 9B shows shows another exemplary embodiment of what might be transmitted from a tag to assist in identifying the location of the tag whereby the power changes with each set of transmissions.

DETAILED DESCRIPTION OF THE INVENTION

Figure 1:
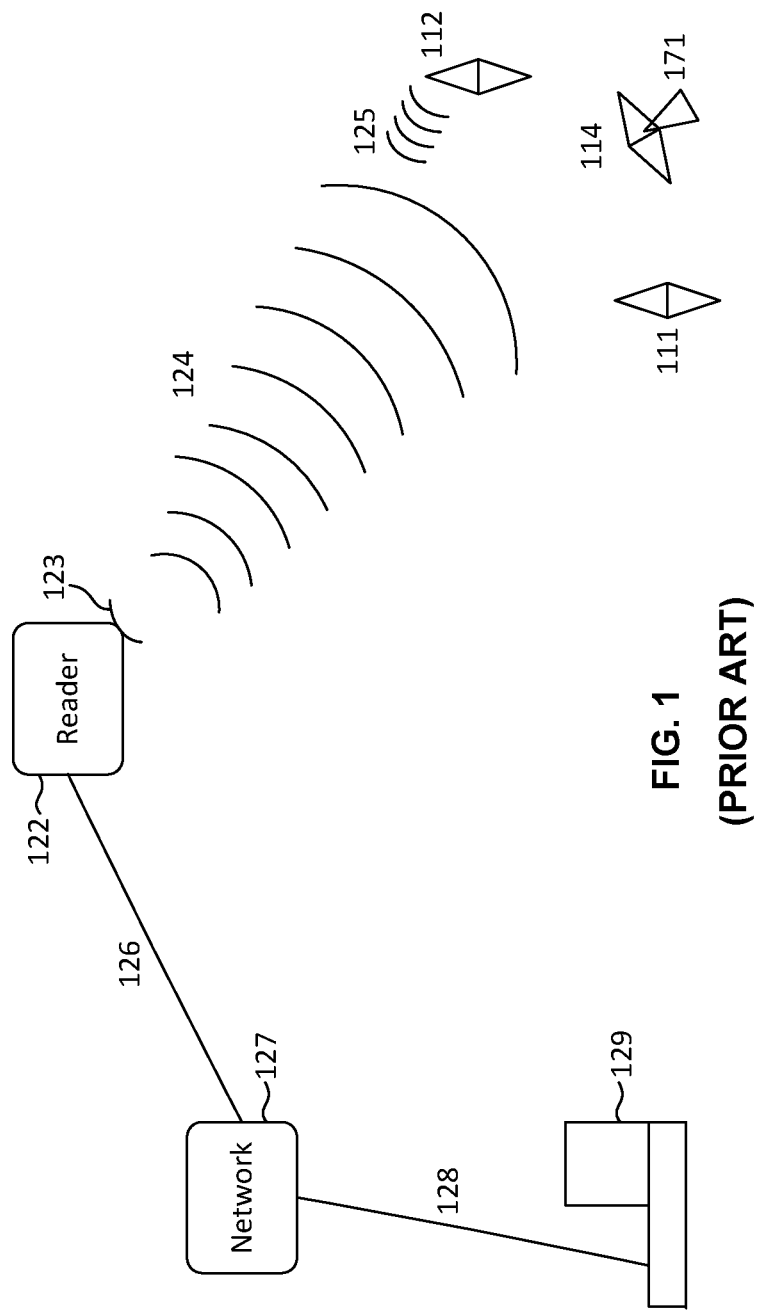
FIG. 1 shows the prior art

A tag detection, location, recovery, data collection and reading system that uses a social network of mobile devices, for example, smartphones, as readers to find lost or stolen goods that are tagged, or to read data or sensor values from tags at remote locations. A mobile device not necessarily belonging to or controlled by the party searching for the tag acts as a proxy reader and detects a tag of interest when that mobile device is within range of the tag. The read is relayed into a network and the party interested in the tag is notified. The tag emits a low power, low duty factor radio frequency (RF), ultrasonic, or other type of transmit signal which may be far field or near-field communications. The location system of the mobile device performing the read is used to determine its location when the tag was detected. Because the tag can only be detected at a short distance, the tag location is known indirectly by virtue of being detected by a mobile device whose location is known. In a large scale embodiment of the system where many tags may be seen by a single mobile device in a short period of time, the mobile device may pre-filter the tag ID to determine if it is on a list of tags of interest, which in an embodiment is done with a filtering algorithm. If the mobile application recognizes the tag information as possibly being of interest, it passes the tag ID up to either a specific network server or cloud based server along with the mobile device's location information, and other information, such as time of day and the information from multiple sequential reads, and the approximate time when the read was performed. The server verifies the tag's full identity, alerts the party interested in the tag as to the tag's location when it was read by the mobile device, and also passes on related data or tag contents the mobile device may have provided to the server. In response, the interested party may then initiate a recovery of the lost or stolen object, or utilize the data or sensor information.

The social networking aspect creates a large group of roaming tag readers out of everyday mobile devices such as people's smartphones and tablets, any of which can participate in the search for a tag by virtue of it running the application in background mode and happening to pass near enough to the tag during the mobile device's normal course of use. Both the tags and the mobile devices that read them can be in arbitrary locations, even in a very different part of the world from the party interested in the tag, and either or both can be mobile or stationary. The tag is read when it crosses paths with any reader at the same time the tag emits its signal. In an embodiment, the tag can be triggered to emit its signal based on detecting RF energy of the mobile device signal emissions when the mobile device crosses paths with the tag.

The tag can emit different transmit power levels, and embed the transmit level information of that transmission into the transmission data, so that it can be found at longer range and then zeroed in on with lower transmit power emissions. The reader can determine if a specific reception was that of a higher power or lower power transmission and thus improve its ability to reduce the ambiguity of the tag location.

Because of the generally low transmit power, the tags can perform their function with very low power consumption, utilize relatively small antennas, have a relatively small form factor, and be of relatively low cost, have small antennas, and can be used on everyday items, and can be very low power consumption. Characterization of the term relatively in this statement is with comparison to tags that must receive as well as transmit. Example calculations follow this discussion. The tags can operate off of very small batteries, or, in some embodiments, operate off of harvested energy. The tag emissions can be self-timed to occur when the energy harvesting has produced enough stored energy to operate the transmitter. An application includes a tag-watch capability whereby when the location of a tag is detected inside or outside a specified geographic boundary an alarm occurs or an alert is sent. Different vertical application embodiments include tags that can be set to indicate the nature of the tagged object with or without identifying a specific item, for example, tags that indicates concealable guns or explosives.

One embodiment of the present invention is used for finding and recovering stolen or lost assets that are tagged with very low-power transmitting tags that occasionally emit a beacon-like signal that contains identifying data (ID) and may also contain other data. One embodiment is that people who download the tag-finding application into their device will let their devices participate in the network of readers searching for tags. The device may be mobile, nomadic, or stationary but many exemplary embodiments described herein will use the term "mobile devices" however it should be understood that there is no requirement for mobility of the device or tag. (A nomadic device is one that can be readily moved but is stationary when in use in the network). Other terms in this specification that will be used to refer to the mobile device is the reader device, the edge device, reader, cell phone reader or the mobile reader. A set of reader devices forms a reader network. An embodiment of the present invention is an apparatus for searching for tags that are part of an enormous list within each, or assisted by each reader individually as a background process without excessively burdening the device's processing capacity. As a result, the network of devices becomes a worldwide cooperative search mechanism working together to detect any and all specific tags on the list of tag IDs deployed in the system.

A user of the application will have registered their item with the ID of the tag that they attach to it. In an exemplary embodiment, when a user reports a tagged item as missing (perhaps stolen), the associated tag ID is sent by the application running on their device to the server where it is compiled with all currently reported missing tag IDs. The compiled list of numbers (which may optionally be compressed in various ways that will be described herein) will be downloaded to all mobile devices participating in the network, or to a subset of the entire set of mobile devices based on geography or other limitation. These mobile devices are now armed to recognize the tags. They are not owned by or controlled by the person looking for the tag. This is one of the important distinguishing factors from prior art. People unknown to the person reporting the missing item, in their normal course of activity, may pass by the tag of interest with their enabled device running the application, and detect the tag from only a short distance away. The detection distance is purposefully limited by way of the tag emitting at a low transmit power, so that the location where detection occurs represents a relatively precise approximation of the location of the tag at the time of detection. Therefore, by virtue of the ubiquity of mobile devices (e.g. smart phones), the tag is likely to eventually be very near a mobile device that can detect it. By knowing the mobile device's location near the time the tag was detected, the tag location and that of the missing item will indirectly be known. The smaller the detection distance, the more accurately the location of the missing item will be determined. The mobile device, after detecting a possible reported missing tag (e.g. by pre-filtering it with a check against a received list, hashed compressed list, Bloom filter, or other filtering algorithm against a data structure containing the identities of reported missing tags), will determine its own location through normal device location capability, and relay the location and the tag identification information into the cell phone network (e.g. by 3G, 4G, 5G, LTE, or Wi-Fi), by way of a text or similar message to the server. The message can contain both the location information and the tag identifier (ID). The mobile device pre-filter will determine that this tag ID is of interest with high likelihood to limit the amount of this traffic relayed up through the network. The full ID will then be compared at the server for a unique identification.

The mobile device may also provide the time that passed between the location measurement and receiving the tag ID. The server will crosscheck the full tag identification number and, if confirmed, initiate a notification process to the tag owner, and optionally, a recovery process. One difference between this network and an RFID network in the prior art, is that the number of cell phone readers is so large, because it is potentially all mobile devices, and can generally be mobile (as are the tags), that the entire world is blanketed with readers that eventually pass near an even larger footprint of area where people go. One can intuitively imagine a swarm of reader locations overlaid on a swarm of tag locations, where any reader can determine if any tag is a likely candidate to be verified by the server. Because of the ubiquity of the readers, the RF transmission from the tag can be very low RF power, because with so many mobile devices (and a significant percentage operating the application), eventually a smartphone or other mobile device will be near enough to a tag to detect its emission.

One reason for someone to participate in finding the tag is that they will want their own possessions to be tagged, and so are motivated to be part of the social network that evolves from the tag search application.

A social network, for purposes of the present invention, is produced when a set of interdependencies are developed between entities that are independently controlled by different people, and are interconnected in a way that one entity can forward or retrieve information from at least one other entity. The searching for a tag ID somewhere in the world that is cooperatively accomplished by different people, who might not have any other connection with each other, and their downloading the application on their mobile devices and participating in the search, is the criteria for the formation of the social network used for security and information gathering in the present invention.

A mobile network is a communications network where the link to the user is wireless, such as the cellular telephone network. The mobile network is comprised of radio hardware that is connected to network operator equipment, including connections into the Internet, as well as various network gear such as switches, routers, and servers. While the operator may maintain servers, the servers that can be accessed by applications running on mobile devices, are generally on the Internet side of an interface to the mobile operator. The server can be a cloud server accessed through a service as well, and can be distributed among multiple servers; the extreme of which is that a set of mobile devices operate a distributed protocol to serve the system. In an exemplary embodiment, a reader device acting as the server can use its current test filter number, use the hash filter algorithm to add a tag value to the current test filter number composition, and republish the result as a new test filter number to the social network that distributed the original test filter number. A reader device can belong to more than one asset tracking social network at a time and thus be working with more than one test filter number at a time. A potential target tag read by a reader device is transmitted to all reader devices in the social network and if the tag is on the list for one of the devices, that device recognizes it and acts as the server, removing the tag from the test filter number when appropriate, and republishing a new number, and sending a notification.

Detection of a tag results in is performed through a process of receiving, demodulation, decoding and recognizing a signal that was received from that specific tag. The tag data is likely protected by a checksum of some type that indicates data integrity.

In one embodiment, the cooperative reader network is a social network of cell phones, tablets and other mobile devices, tied together through a mobile network. The participating mobile devices run application software whereby information can be pushed out to the mobile devices as a tag ID inquiry report from one member of the social network, through a server, where the ID is combined with other inquiry IDs from other users. The combined and compressed information is pushed out to the cooperative network participants, so that the other devices in the network can be helpful to search for a tag by comparing tag IDs that each encounters to the IDs they are looking for. A positive result is a detection at the mobile device, and then the tag ID is relayed to a server for verification, which will initiate a report of the found tag if verified. Such cooperative use of the network forms a community of users.

The server processes the multiple inquiry reports in a way that makes the comparison of IDs that each mobile device encounters practical for a very large number of simultaneously outstanding inquiry reports. In a broadly scalable system, the simultaneous outstanding reports can number in the many millions and it is not practical to push a simple list of millions of IDs out to each mobile device, and have each mobile device compare each tag it encounters to a list of millions of numbers, nor is it practical to relay every tag ID each reader encounters to a server for comparison. To solve this scalability problem, an embodiment of this invention is to have a server apparatus that compresses multiple tag IDs into a compressed data structure that is then passed to the mobile devices by the network apparatus, wherein a prefilter apparatus in the mobile devices use a simplified computation to check if an encountered tag ID is among the list by processing the tag ID against the compressed data structure with an algorithm apparatus. The mobile device apparatus determines if the tag is a likely match to the list. The full tag ID is then passed to the server apparatus by the network apparatus if there is a likely match, for verification by the server apparatus if needed. Certain compressed data structures disclosed in this invention may even result in determining with certainty at the mobile device that there is match in which case the verification in the server apparatus isn't used.

Because RF range of the tag is short, which drastically reduces location error, it also means the tag can use very low RF Tx power, allowing it to be very low cost, and very small, consume very low supply power, and to use a small antenna. These combine to make it practical for the tags to be used on everyday items and to be hidden on those items.

A way to envision the present invention is by example. This is not meant to be a complete set of use cases, but is only intended to be informative as an exemplary embodiment. It is recognized that some parts may be left out, added or modified without changing the invention and result of achieving scalability. A watch is stolen in San Francisco and finds its way to New York. The owner in San Francisco had tagged the watch, and registered the tag with the application running on their smartphone. They indicate to the application that the watch was stolen. The application sends the tag ID for the watch to the server. The server compiles the reported stolen tag into a compressed data structure which can have a form of numbers, a list or one or more combined hash values as described herein. The compressed data structure composed of the currently reported missing tags is pushed down to all users of the application (for example, once per day or on demand). Someone in a café in New York is wearing the watch, and someone at the next table has a smartphone with the application running and armed with the compressed data structure of tag IDs to look for. The watch tag emits a signal at a low duty cycle (e.g. 1 per second as a Wi-Fi beacon) and the smartphone at the next table in the café in New York picks up the signal on its Wi-Fi receiver. The smartphone application apparatus recognizes the address as a tag ID, applies the algorithm on the tag ID and the compressed list data structure it received, and determines the tag ID is part of the composition of the compressed list data structure and so is a potential match with the tag someone is looking for. The mobile device establishes its own location, and then sends a message to the server that it has a possible find, along with the tag ID and a location. The server confirms that this is the reported watch, and informs the user. The user then enables the application to initiate a recovery process, whereby the authorities are notified. It is also possible to use a private recovery service where the user pays a fee to recover the item, which provides a business model for use of the system. Another business model is a pay-per-report model, where a user reporting a missing tag would have to pay a fee for generating the search activity, and would then optionally pay a recovery fee.

In this way, the cell phone network is a massive reader network where arbitrary readers pass in front of the tags at arbitrary times in arbitrary locations, instead of the conventional reader network where the tags must come to the reader. Even with a prior art handheld mobile RFID reader, the read space is contained within the confines of an enterprise and a very limited access. The present invention takes advantage of the pervasiveness of mobile devices and social networking aspects of the interaction of multiple independent users tied together through the use of the application to serve the purpose of fighting crime and providing security.

As stated earlier, the reading device need not be mobile. A smart phone has the capability of recognizing a tag in an arbitrary location, such as out in the street, but the application that recognizes the tag ID can also operate in any computing device or access point that might be in a coffee shop. For example, if the access point in the coffee shop in New York in the example above were loaded with the application, that device could also recognize and report the tag.

In an exemplary embodiment, the filter in the reader device is set up to pass all tags that could be among the sought after tags, but to minimize the probability of false detection of a tag not on the list. In one embodiment, the search space in terms of network size is limited by region for a first time period that a sought after tag has been reported. After the time period that the geographic region limit is expected to be old information, the region may be expanded, and this would continue over time to eventually cover the world (if an item is missing for a week vs. an hour, the geographic possibilities are different). One result of this method is to reduce the probability of a false detection and also to allow a more readily calculated compressed data structure.

Ultimately the server can verify the tag IDs but reducing false detections reduces the network traffic and server load and reduces the number of unnecessary messages sent by a mobile device. A method known in the art as a Bloom filter can be used to test whether an element is a probably a member of a set or definitely not a member of a set. Tradeoffs of which filtering function to use depends on the number of missing tags the system is designed to accommodate at any one time, the storage space required for the filter values, the computation requirements to use the filter, whether the tag must store and transmit its own check value along with its full tag ID value compared to if the hashed check value can be calculated in real time from the tag ID value in the local mobile device, and how often the filter value would need to be updated. The filter test value that has the combined information would be calculated based on an aggregated set of tag IDs and the calculated test value would be pushed out to the participating reader devices so they can locally decide if a tag they observe is a likely target. Only if the hashed ID passes the local filter, would the device send the full tag ID and the reader device location information (and potentially tag data if it is that type of tag) to the aggregation point for verification and further processing and/or reporting.

The aggregation point can be a server, a cloud service, or one of the devices that is part of the social network. It is anticipated that the server function can also be distributed across multiple devices or servers or a combination. The social network can be worldwide in one exemplary embodiment, and in another exemplary embodiment, a friends and family group that is local to a household, neighborhood, school, or workplace. Similarly, companies, such as delivery carriers, may form a closed group which allows, for example, a package to be found if it is misplaced.

An exemplary embodiment is that the application can combine filtered tag IDs with geographic region, so that you can easily filter tags that have crossed regional boundaries as a specific application feature. In exemplary embodiments tag IDs may be programmable or may be pre-programmed in the manufacture or distribution process since the user application apparatus can customize the information associated with a tag without that tag ID being manipulated. The tag ID may also contain part or all of its own hash information to reduce the calculations required on the reading mobile device.

Another embodiment of the present invention is the use of the server to compile and compress or hash the tag ID information for large numbers of tag IDs that are potentially simultaneously waiting to be found. This compressed list or set of one or more hash values can be pushed out to the mobile devices that are running the application to allow pre-filtering of tag IDs at the mobile devices from the population of tags they encounter. This compression enables the use of a smartphone application to be able to compare a single tag in a sea of potential tag IDs to determine if it has a high probability of being a tag of interest, i.e. one of the many possible reported tags. Consider that there are trillions of items of interest that could potentially be tagged, and that 100 Million of them actually are tagged. This could occur from only 10 Million people on earth using the system and each having tagged 10 items. Also, assume due to demographics, that there are pockets of density of the tagged items, such as in urban areas. There could potentially be many smartphones and other mobile devices, each within the vicinity of hundreds or even thousands of tags each day. With over 8 Million thefts a year in the US alone, (20 thousand/day) there could be many 10s of thousands of tags that are simultaneously reported stolen, any one mobile device might encounter hundreds of tags per day. Sending every observed tag ID up to the server would be excessive traffic generated by the mobile devices, and unnecessary load on the server. Instead of reporting on hundreds of IDs, each phones can pre-filter the tag IDs before relaying them up to the server. Each mobile device essentially offloads part of the analysis. But with potentially 10s of thousands of missing tags reported at any one time, this is too much information for a smartphone to be storing and comparing against for each tag it receives. Instead, the list may be compressed or hashed for simplified processing. Such an algorithm can be made to have a low probability of numeric collision (i.e. two different tag IDs can have the same result) so long as the action is to pass either tag that would have collided to the server for confirmation, where the unique ID information will be verified. The algorithm to generate and compare to the compressed list or hash value may have false positives, but not false negatives, so that a true tag detection is not missed. With the restriction that there are no false negatives but allowance for some false positives, a tag will not be continually rejected by all phones working off the same compressed or hashed list. In the worst case, in order to not reject any tags that have possibilities, it may cause a few extra tags to be sent to the server for verification.

One way to implement such an algorithm is with a hash of all the missing tags. The hash compare would also allow false positives but no false negatives. To simplify the computation, multiple hash algorithms can be combined that have independent results where each allows a substantial false positive, but the net number of false positives that pass multiple tests is reduced.

One embodiment of a hash algorithm that is part of an exemplary embodiment of the present invention is to assign a prime number to each tag ID. The prime number could serve as the tag ID or could be an auxiliary ID, or could be computed from a hash of the tag ID. There are approximately 30% as many prime numbers as there are positive whole numbers, for large quantities of tag IDs, (e.g. theory of density of primes) so doing this only expands the number of identifying digits by 2 binary values in order to uniquely map each identifier to a prime number. By multiplying all the prime numbers together, a test number is generated that can only be factored by a prime number (because the prime numbers themselves are not factorable). The final number is passed to the mobile devices. Each mobile device would then divide the test number by the prime number of the tag it has received a signal from, and if the result has no remainder, consider the tag a candidate for a reported tag. Due to either limitations of the truncation errors that can occur on the device from limitations in the math used to do the calculations, or due to aliasing of number space of a rollover calculation is used, it is possible that a prime number representing a tag that is not among those reported could also have no remainder from the division and this would be a false positive. But with appropriate limits set, a tag that is among those that were combined into the test number together would not result in a remainder and so would always be found. The end result of this algorithm would be to greatly reduce the number of candidate tag IDs that are passed into the network (depending on the redundancy in the use of the prime numbers). By using different algorithms for generating the prime numbers from the tag IDs, different test numbers could be generated with independent results that would always pass a tag that was used to generate the test numbers and greatly reduce the passing of a tag that was not.

Part of an exemplary embodiment of the present invention is also to deterministically relate a prime number to a tag ID based on a hash calculation. For example, the digits of the tag ID (base 10) could be multiplied together, and then the nearest prime larger than the result could be found by trial and error based on a factorability test, or from a table look up against the product. To assist this calculation in the mobile device, additional information may be stored in the tag and delivered as data, including the prime number the tag ID converts to. Other mathematical and table lookup operations on prime numbers are also an embodiment which may include modulo arithmetic, exponential relations, permutations and sub-grouping. Similarly, it is an exemplary embodiment that if a Bloom filter or other type of filter that requires computation at the reading device is used, the calculation or partial calculation can be performed when writing the tag and the result of such a calculation can be saved on the tag and read out with the tag ID; thus saving the reading device from having to do the full calculation of the filter input for the many tags it sees. The software application on the reading device can also cache the calculation for some period of time in anticipation of seeing the same tag repeatedly. One advantage of not pre-computing the hash or part of the hash and storing it is that the algorithm can be more flexible and improve over time if the calculation can be updated when the software application running on the reading device is updated. Another is that it consumes tag energy to transmit more information than the tag ID. If the stored part of the calculation is half as many bits as the tag ID itself, then it would require 50% more transmit energy to send both of these values. On the other hand, the advantages of pre-computing and storing the calculated values or partial-calculations on the tag has its advantages and should be considered as part of an entire system design.

As another embodiment, the product can be calculated based on a function of the digits instead of using the digits directly, as long as the process is repeatable. The translation to a prime number would then be based on a conversion, and the primes representing each tag ID that is reported would be multiplied together in the server.

By using different hashing algorithms on the tag IDs, different results occur. In one embodiment of the present invention multiple hashing algorithms may be used to result in different prime numbers for the same tag, and thus multiple values for testing the detected tags. The multiple test may be used in an exemplary embodiment to force a tag ID to pass the aforementioned division test with no remainder on all on all tests, or on a subset of prime-products in order to be accepted as a potential reported tag. Other known operations besides division may be used to invert the grouping algorithm that combines the prime numbers such as Chinese remainder theorem and other mathematical algorithms. The net result is that operations on prime numbers relating to the actual tag IDs provides results that indicate a high likelihood that the tag ID is among the group that is being searched without checking the full ID against a full list of IDs; the end result is scalability to large numbers of tags being searched among an even larger possible range of tag IDs. Each of the computed results (products or other operations of prime numbers that represent a reported tag) are pushed out to the mobile devices to serve as pre-filter tests to decide a tag should be sent up to the server. A Bloom filter is one apparatus that can be used. A new filter value would have to be calculated from scratch and transmitted to the reading devices each time a tag was added or removed from the list because values cannot readily be removed from a Bloom filter (the counting bloom filter increases storage by the count factor). As an exemplary embodiment, a way to reduce the load on this calculation at the aggregation point is to calculate the Bloom algorithm over smaller groups of tag IDs, then combine the results of these smaller calculations into the final test value. If a tag is to be removed, only its smaller group would need to be recalculated. If instead of a Bloom filter, a product calculation is used that multiplies prime numbers together, removal of a tag ID is performed by dividing the product value by the prime number representing the tag ID.

The scaling of this social network for detection, tracking, and information retrieval is thus enabled for large numbers of concurrently reported tags with the computational load mostly absorbed in the calculation of the test numbers by the server.

In a social group of limited size (e.g. friends and family), all reported tags can be combined to a compressed list that can be distributed to all the phones in the network (or a subnetwork which may be limited by region). The scale of this operation is smaller than the full worldwide network so the server operation can be minimized, and may even be performed by one of the reader devices in the group. For example, a master application may run on a reader device that combines the group of tag IDs for all participants in the group. The list may be compressed or uncompressed, and pushed out to all participants in the group so that they may assist each other in recognizing the location of the tags. The last known location may be tracked for a small group by saving the information locally for later retrieval or by passing the information to the server that maintains the list of the latest information observed by any of the participants for any tag in the combined list. The inquiry approach is also adaptable to the group in that an inquiry can go to the group either directly or through the server to search for a specific tag ID. If multiple requests are pending simultaneously, the list can be compressed as discussed herein.

If a perfect test algorithm is used at the reader device then verification is not necessary. An exemplary embodiment is that a product of prime numbers where the number does not exceed the mathematical capabilities of the reader device. In this exemplary embodiment, arbitrary devices in the social network have the ability to calculate a prime number for a new tag, multiply the prime number by the existing test filter value, and push that value out to the other participants in the social network. Upon reading a tag, each participating reader device can divide the test filter value by the prime number associated with the tag it reads (either calculated locally or stored on the tag) and determine if the tag has been found. The local reader device can redistribute the new test filter value that is left after dividing out the tag prime number that it just processed so other reader devices do not continue to track that tag. Similar permutations of the use of the apparatus of the present invention will be understood to be useful to fulfill different search and tracking requirements.

The tag is attached to the item in any number of ways provided the signal can reach a receiver. For example, the tag may be attached with glue to the outside of an item, or may be inside the item case, or in the battery compartment.

The tag can also operate at low duty factor because if it is not picked up by one mobile device near it, eventually there will be another near it. The tag transmitting at short range and low duty factor can then operate on ultra-low average power drain. It is further an embodiment of the present invention that the tag operates at such a low duty factor and low transmit power that it may be powered either by an extremely small battery, or, by energy harvesting from the environment (e.g. electromagnetic, near-field, vibrational, thermal) but can be charged from wireless chargers as well. In general, a tag does not need to rely on the power of any device to which it is attached, but this is not precluded. The ultra-low power capability is a manifestation of not requiring either long operating range or two way transmission supporting multiple operations in a protocol stack. This feature distinguishes the invention from low energy Bluetooth, for example, in the prior art in which the range is desired to be maximized between the mobile device and the tag so that the tag beeper can be triggered through use of the protocol stack. The user then searches for the sound of the beeper. In an embodiment of the present invention the apparatus does not require a protocol stack in the tag or two way communications as the tag can simply announce its presence and by virtue of short range to the reader, and the scalable pre-filtering in the reader, be found.

It is further an embodiment of the present invention that the signal transmitted from the tags will have different power levels over time and that the relative or absolute power level used will be announced in the transmitted signal. The reader can determine if it has detected a higher or lower power transmission, where a the detection of a lower power transmission would imply the tag is closer. The maximum range can be achieved with the higher power level and the mobile device can determine if it is getting closer or further away from the tag over multiple receive periods by increasing its likelihood of receiving the lower power level transmissions. The application can decipher the receptions as the reader moves around and indicate a trajectory that would lead to improved reception of the lower power transmissions, and thus the likely direction the tag is located in.

It is further an embodiment of the present invention that the tags may also be sensor tags whereby the tags collect data and transmit the data in their transmissions so that a nearby mobile device, when identifying the tag and passing the tag ID to the server, can also pass the information the tag has transmitted to the server. The tag may, for example, capture the temperature over time and save it in memory, and when transmitting its ID, also transmit the list of temperatures and associated times when they were read. Relative time is sufficient on the tag as the reader can compare the tag's version of relative time to its knowledge of absolute time. When deciding to use a sensor tag, the user will indicate that a sensor tag needs monitoring and the ID of the sensor tag will be added to the compressed list. The mobile device will identify this tag as the potential sensor tag and send its information to the server, which will verify the identity, and if verified, will pass the data to the user or user application. Using the present invention, millions of sensor tags can be monitored simultaneously without any installation of special reader equipment. If the sensor or other data captured by the tag is a large amount of data, the reader can hold onto the data until the ID verification is confirmed by the server. Some tags may be able to receive as well as transmit. If the tag can receive, the tag can hold onto the data until the reader receives the confirmation, and then re-interrogates the tag telling to pass up its data.

Not every tag has to be an ultra-low power tag that can run off of energy harvesting. A higher power tag can be read at longer range using the exact same mechanisms described herein. Such a tag could be detected in the same house or large space as the reader. A low power tag can also transmit at high RF power every once in a while, for example, every $10^{th}$ set of beacons could be higher RF transmit power, thus maintaining low average power but allowing for improved range so that the reader can be alerted to its general vicinity and then narrow in on its location. This embodiment still uses the mobile network as a reader network and still depends on the social network aspects in that the mobile device that detects and indirectly locates the tag that may be owned by someone that has no other connection with the person who is looking for the tag, and is connected to the owner of the tag by this action.

The tags will have a unique identifier. The unique identifier technique has been used many times in the past in RFID[5] and is well understood in the art. There are at least two ways considered to use a unique identifier that has been associated with a tag. One is that a preamble identifier such as an IEEE 6 byte MAC address identifies the type of signal the reader is seeing, and then the application looks inside the packet to get the tag ID number. The other is to use the tag ID number for the initial detection. A person skilled in the art will recognize that for the different methods the results are a little different in how the application processing operates in the normal device driver for the mobile device.

Figure 2:
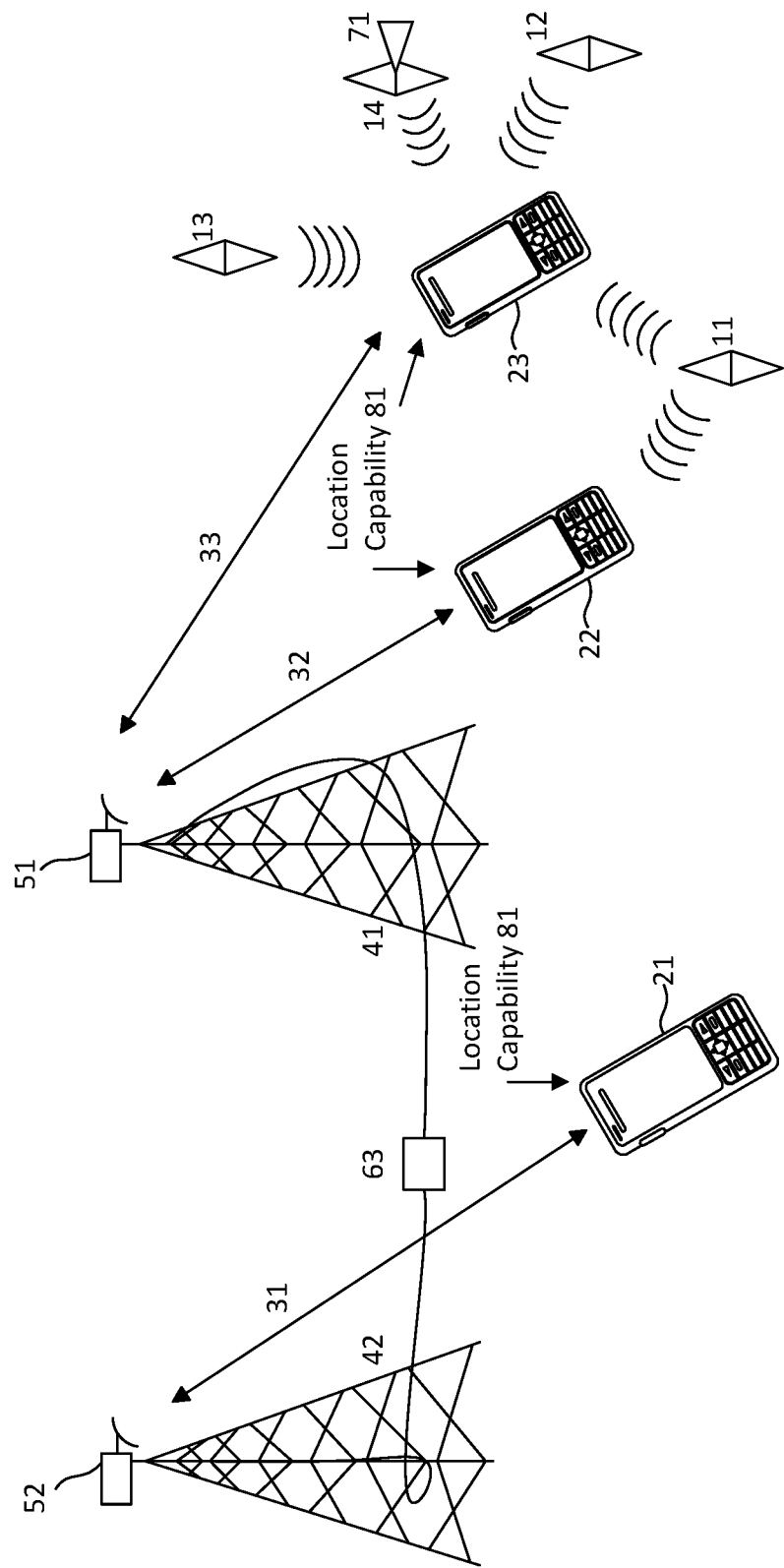
FIG. 2 Shows one embodiment of the invention with smart phones reading tags in their vicinity.

FIG. 2 shows an exemplary embodiment of the present invention, comprising a cellular network comprising entities 21, 22, and 23 which are mobile devices such as smartphones or tablets, cell towers 41 and 42 and their electronics in 51 and 52, respectively, which are part of a mobile network and could just as well be small cells or pico-cells, and are connected to the server 63 (connection is figuratively shown), which computes the push list or test number(s) that go out to all mobile devices in the selected group that are running the application. The selected group may be all mobile devices or a subset. The subset may be based on geographical proximity to mobile device 21, and may also be based on time since the missing tag was reported. The RF connections into the network are 31 for mobile device 21, and 32,33 for mobile devices 22,23 respectively. Each mobile device typically has some exposure to tags in its normal environment.

Tags 11, 12 and 14 in FIG. 2 are item tags (asset tags) and tag 14 is an item tag with a sensor 71. If, for example, tag 11 is reported lost by the user of 21 through the application running on 21, and tag 11 is received by phones 22 and 23, time stamped data about the location of tag 11 will be reported to the serverby phones 22 and 23. In the example, Tag 13 is out of range of any mobile device in the current state of the figure.

Tag 12 in FIG. 2 is heard by 23 and ignored because it is not a reported tag. Tag 14 is registered as a sensor shown as being attached to the tag circuit (temperature sensor 71). Phone 23 receives tag 14, and at least temporarily stores its contents to be passed into the network when the ID is verified.

Figure 3:
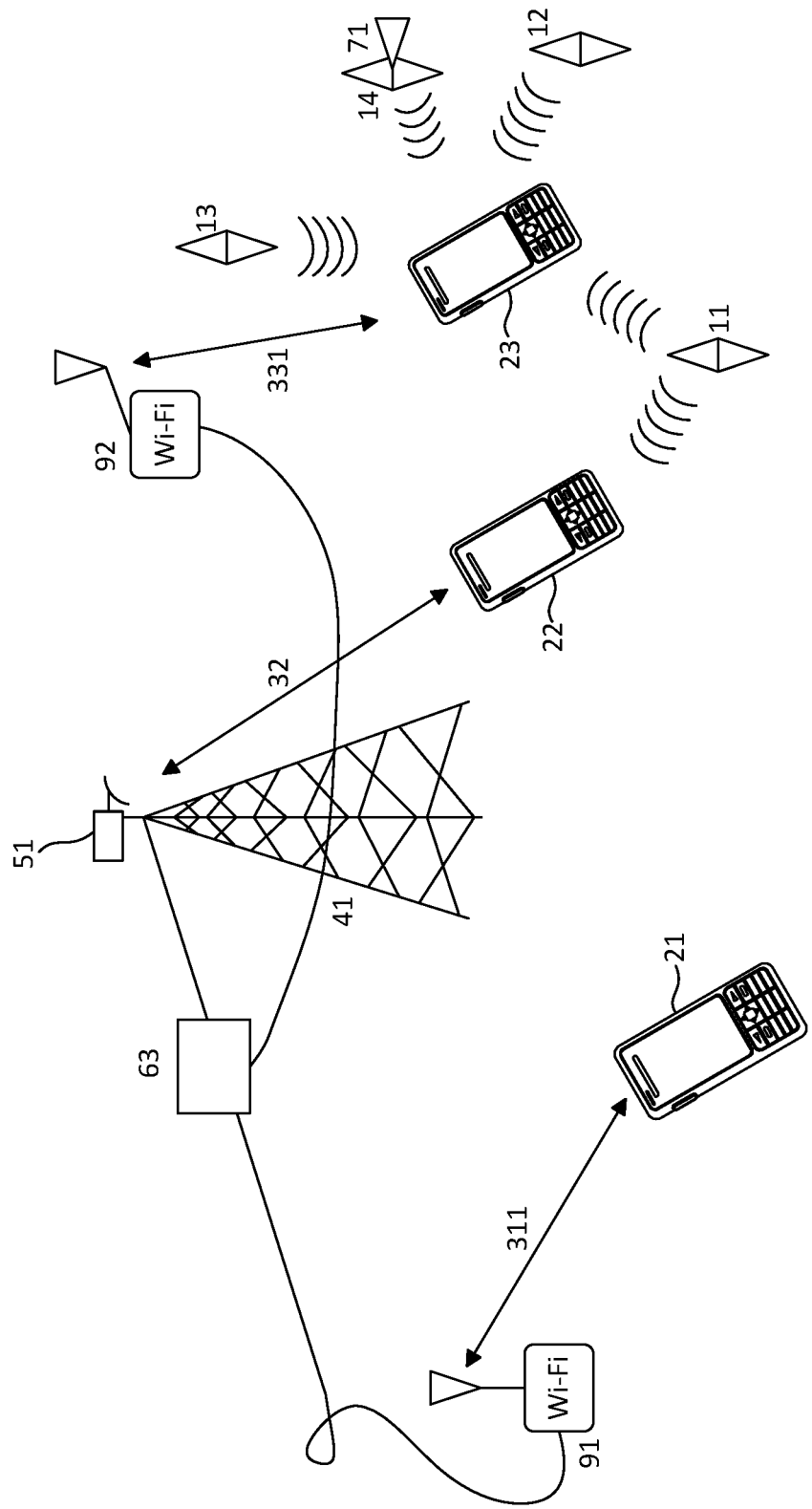
FIG. 3 Shows an embodiment that uses Wi-Fi routers to connect into the network.

FIG. 3 shows the same mobile devices as in FIG. 2 but demonstrates that they can also be connected into the network with a Wi-Fi connection into the cellular system So that phone 21 connects to Wi-Fi router or access point through RF connection 311, relaying the tag search request. Mobile device 22 can report through the RF connection 32 into the cellular system through base station 51 on tower 41, and, phone 23 that has also seen the tag in this illustrative exemplary embodiment, can report through RF connection 331 to Wi-Fi router or access point 82 which is tied into the cellular network. The report can be the location of the tag or can be information provided by the tag, such as sensor information (temperature, voltage, etc.) or other collected information (such as audio or video recordings).

Figure 4:
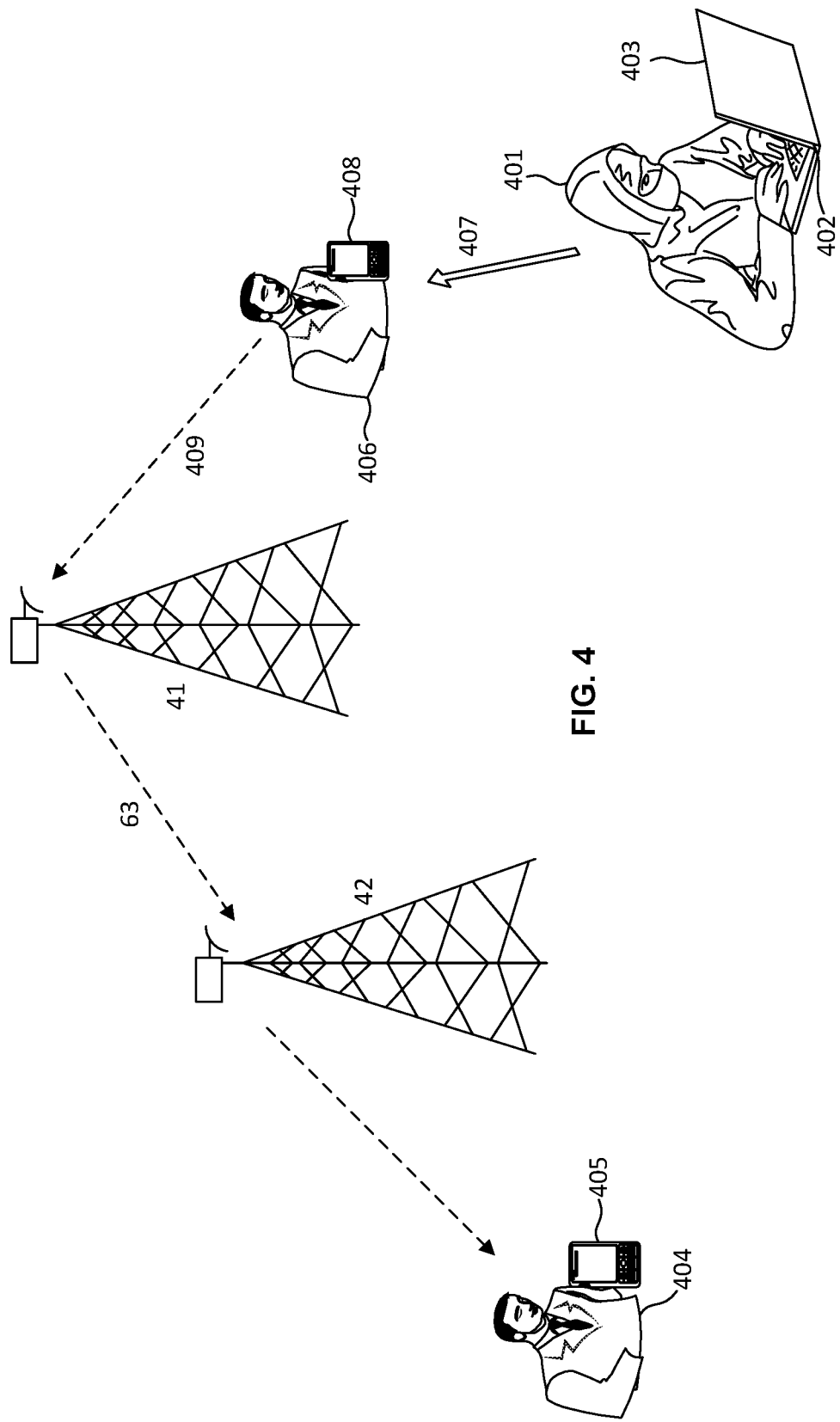
FIG. 4 Shows an exemplary embodiment of how the use of the network would operate to recover stolen property attached to a tag.

FIG. 4 demonstrates an exemplary embodiment of how the use of the tag would operate. A thief 401 steals laptop 402 or other goods that are tagged with tracking tag 403. Tracking tag 403 emits an occasional low power RF transmission 407 containing identification (ID) information.

Owner 404 of laptop reports the theft to the server by way of the mobile application 405 (or a web based interface) and the cellular network.

Arbitrary person 406 walks by with their smartphone 408 that is running the application of the present invention.

The smartphone 408 receives the tag transmission 407 and computes if this is a likely reported missing tag based on the compressed or hash filtered information in the phone, which is based on all the numbers provided to the server by incoming reports. The smartphone 408 may see tens of tags in its normal activity during the day or even at any one time. But they are not all stolen or sensors that need to be monitored. So the smartphone 408 must determine if there is a reported tag among them. It receives them all, and for each one, compares to the compressed or hashed list to see if the tag ID passes the initial filter, making it likely that this tag is one that is reported.

If the smartphone or other device that reads the tags determines a likely match has occurred, it stores its own location information from as close to the time of the tag transmission as it is able. The mobile device may perform the self-location process before or after testing the tag number. Doing so before requires unnecessary location processing when there is no tag match, but possibly more accurate information if there is a tag match. The mobile device then relays the information to the server through the cellphone system. (The phone may request permission from its user to do so if desired).

Once the information, including ID is received by the server, the full tag ID is verified by the server, and if a positive match is made for a reported theft, a procedure for recovery of the stolen item is initiated with the authorities.

Figure 5:
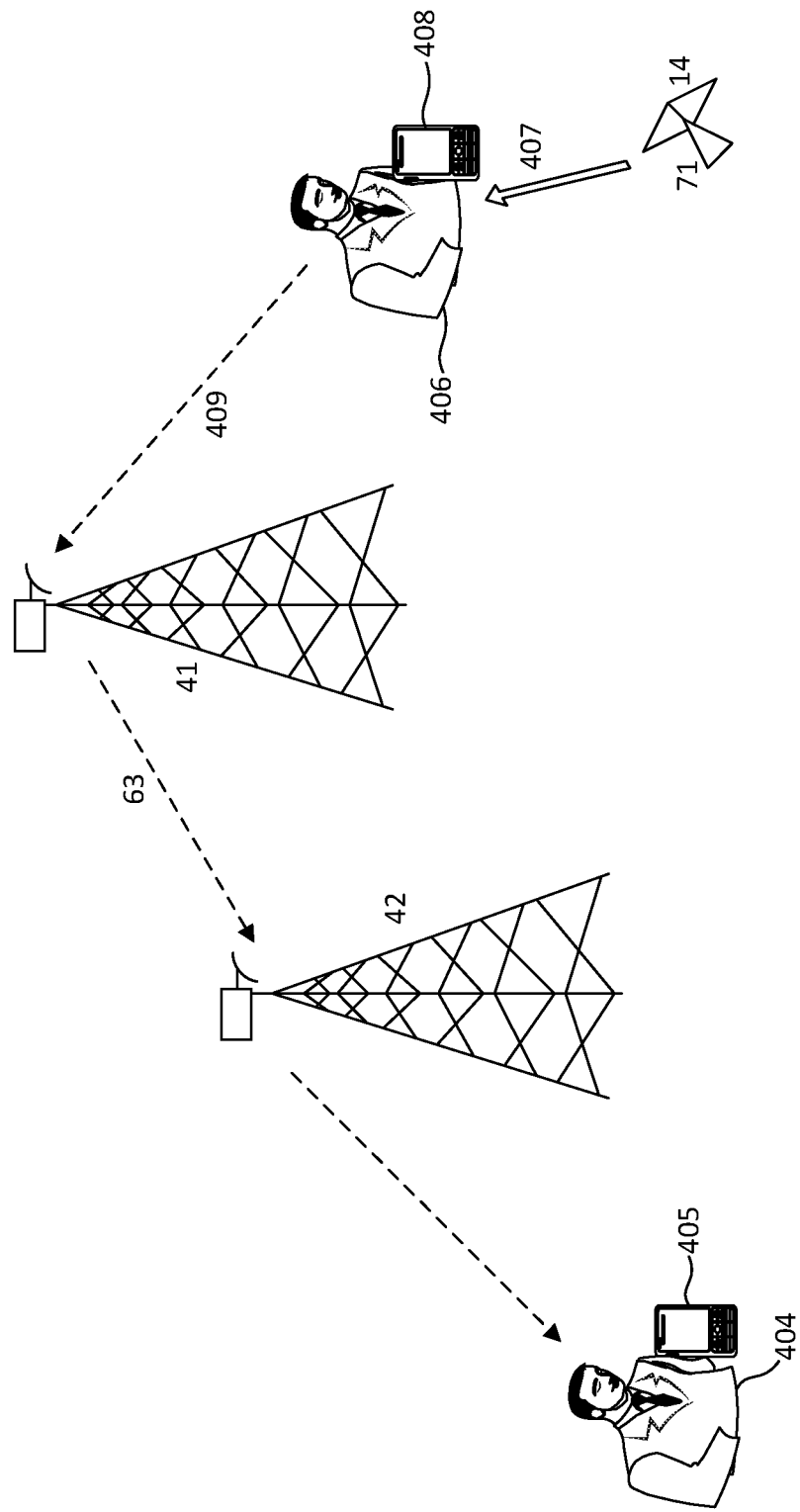
FIG. 5 Shows an exemplary embodiment of how the use of the network would operate to receive sensor or recorded information from a tag.

If the tag is a sensor, then the additional result is that the sensor information is passed to the appropriate place as shown in FIG. 5. In FIG. 5, an exemplary embodiment of using the social network to retrieve sensor information is shown. Owner 404 of sensor tag reports through application 405 that they want to monitor sensor tag 14 with sensor 71 or get a current status of that tag. Tag 14 emits occasional low power RF transmission 407 with identification (ID) information and some data. Arbitrary person 406 walks by with a smartphone or other mobile device 408 that is running the application. The phone hears the tag transmission 407 and stores its own location information at the time it saw the transmission. The phone processes the tag ID through the hash filter to determine if it is likely a reported Tag. If so, the phone relays the information and data to the server through the cell phone system. In an embodiment, the application may also run a multipart protocol whereby the mobile device temporarily stores the tag data, and after receiving a confirmation from the server that the pre-filtered tag is indeed the correct tag and then the associated tag data is sent. This would be efficient if there was a great deal of data. If it turns out 14 is not a reported tag, the phone drops the tag ID and location information and any data it had stored.

Figure 6:
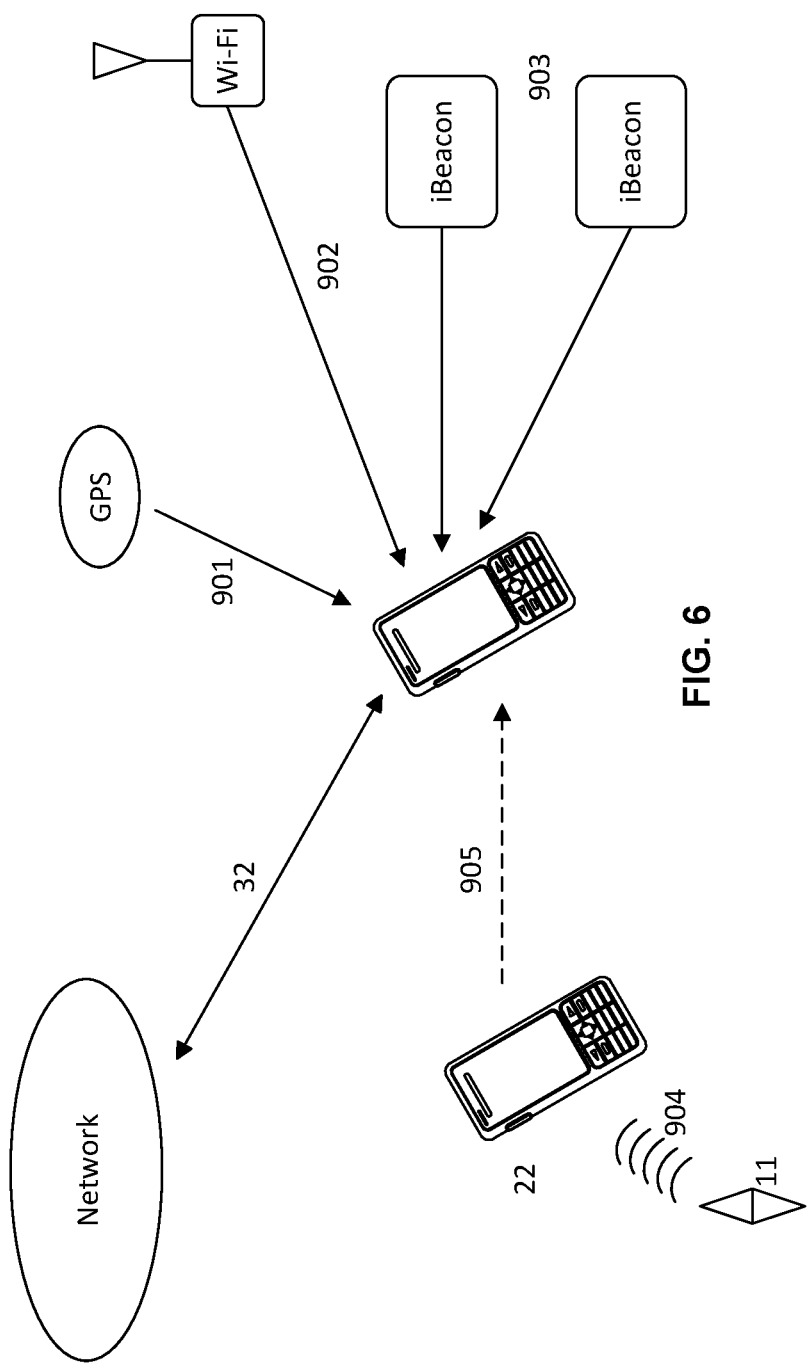
FIG. 6 Shows an exemplary embodiment of how a mobile device might first receive a tag RF signal in one location, and then move to a different position, and determine the best information to send to the server regarding its position when identifying the tag.

FIG. 6 shows how a mobile device 22 might first receive a tag 11 through RF signal 904 in one location, and the move to a different position along trajectory 905 to a new position before completing a location operation, said location operation possibly enabled by satellite GPS or indoor GPS, Wi-Fi positioning, iBeacon positioning, etc. Therefore there will be a tag read in one location and the position associated with it in another. If this read occurred closer in time to the tag read than the position operation that last occurred prior to the tag read, then this location might be assumed to be the best information of the two reads. An improvement would be to track the mobile device velocity before and after the tag read and use the time to closest read and velocity to determine if the best information is in the location last determined prior to the tag read or after that taken the tag read.

Figure 7:
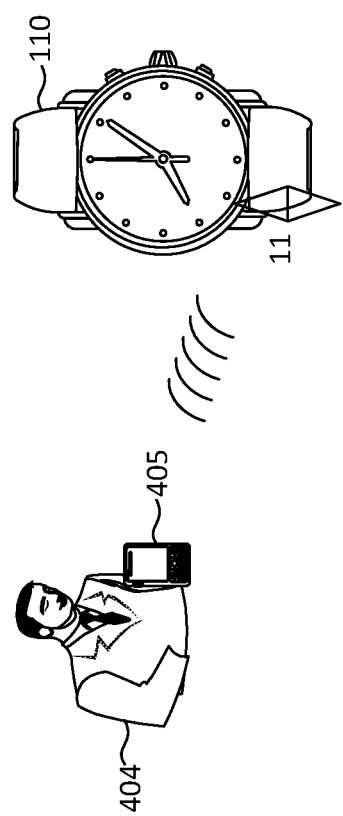
FIG. 7 Shows an exemplary embodiment of how a tag might be attached to an item of property, and registered by the owner as being associated with that property.

FIG. 7 illustrates an exemplary embodiment of how a tag can get registered in the application running in the local mobile device. The tag 11 radiates its normal signal and the user 404 brings a mobile device 405 running the application very close to the tagged item 110 such that the signal level reaches a threshold and is the highest signal that the receiver sees. This is determined by moving the mobile device 405 closer to the item and recognizing the signal which increases in amplitude. There may be distant tags that can be received but they would not show the same increase in level when the mobile 405 is placed adjacent to the item. Once determined, the user will use the application to specify what the item 110 is. This will then result in a reverse assignment whereby the user looks up the item and the associated tag ID is determined in order to make a report to the system of a lost or stolen tag or a sensor that needs to be monitored. One way to enter the item 110 is with a simple photo, that then gets associated by the application with the tag ID. Another is anticipatory labeling where a menu of types of items (personal, business, etc.) may be further broken down into item types and then readily selected. Additionally, the item or additional information about the item can be typed in. The tag will require some form of antenna, which, in some cases, can be the device it is attached to if that device is metallic and the tag can be coupled (e.g. capacitively) to the device. The registration for the tag is local to the initiator's mobile device but any device in the network that is running the application can read the tag and locate it or get its data if it is a sensor tag.

The list of registered tags can remain on the participant's mobile device, be synchronized among multiple devices or be in the cloud in server space they have access to or a combination thereof and can serve as a backup of the registered list.

A local mode is available where all devices in a subset of the list on a local mobile device records the last known location of each item based on the same method but without going out to the server and the social network. Similarly, friend and family or company or workplace groups may be formed where a subset of each other's tags are constantly monitored for quick information of one person's item from another person's mobile device in social network fashion, but without having to push the tag report out to the device because of the limited numbers of devices that are managed this way. Each of the mobile devices in a group carries the same subset of tag IDs in its local list. The server can be used to insure this or the application can register the group where it transfers information updates between the users devices or to synchronize lists on multiple devices of a single user.

Figure 8:
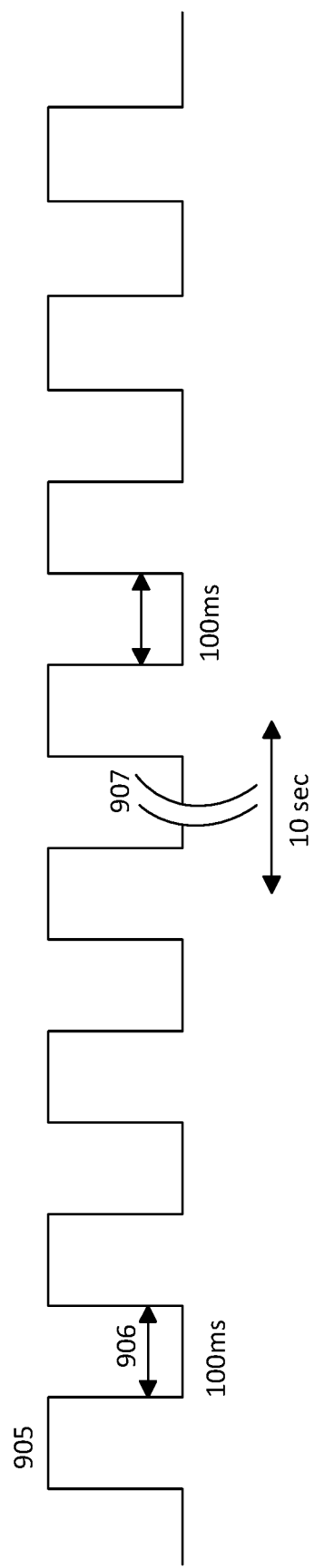
FIG. 8 Shows a simple set of sub-burst pulses as examples of embodiments of the transmission period from the tag.

FIG. 8 shows an exemplary embodiment of a simple identification waveform represented by pulses 905 that indicate the transmitter is transmitting a data packet when the waveform is in the high state. An exemplary embodiment of this waveform transmitted by the tags is a Wi-Fi beacon. A beacon can be transmitted in the lowest Wi-Fi data rate in order to be low power and require a small amount of processing circuitry. The beacon should contain an ID. It may contain a separate ID to indicate to the application that it should consider this RF source as being a tag, and then look into the data packet for additional ID information. In this figure there are bursts of beacons, where the beacons are separated by 100 msec 906 of quiet time, and the bursts are separated by 10 sec 907. These times are exemplary and are used to point out that there should be a long enough beacon burst that there is a high probability that the beacons are detected, but that there is enough time between bursts that the duty factor is so low that the average power consumed by the tag is very low. For example, bursts of 5 beacons that occur with an interval of 100 msec, with the group recurring every 10 seconds have a 5% duty factor of the bursts. The bursts may be of beacons that last approximately 500 usec with 99.5 msec between each. The net average transmit time for this example, which is strictly an exemplary embodiment for purpose of explanation is 100*0.5*5/(99.5*4+10000) =0.024% thus providing a 4000:1 off/on ratio. While the tag is off, a ultra-low-power timer can operate to determine when it is time to transmit as well as a small amount of logic, but that can all operate in about 1 microwatts. The transmitter can emit using 100 microwatts and achieve 5-20 meters receive distance.

As an example calculation of these results, consider that the most ubiquitous use of Wi-Fi is at 2.4 GHz and that a tag harvesting energy from the environment only has to transmit, without any need to receive. If the tags operate at 2.4 GHz, the wavelength is about 10 cm. The free space path loss at 1 meter range is about 42 dBm. Transmitting at −20 dEm EIRP allows the reader to receive the signal at −72 dBm at 3 meters distance. A level of −20 dBm is 10 microwatts power. This would require about 30 microwatts raw power to transmit and run the circuits which is typical Wi-Fi tags. The lowest level modulation for a Wi-Fi beacon is constant envelope so a class C amplifier can be used. It is possible to go even lower in both transmit power and overhead but this number will be used as a conservative estimate. For a duty factor of 4000:1 as calculated above, the average power to support this peak power requirement is less than 1 nanowatt. On the other hand, in order to operate at a low duty factor there needs to be a timer mechanism. A low power timer will take about 100 nanowatts so this will dominate the power requirement. This power level can be accommodated by various forms of environmental energy harvesting, including absorbing energy from stray RF signals in the environment using a series of diodes, vibration, heat or light. Another exemplary embodiment that can be used as an alternative to a timer, and dramatically lowering the required energy harvesting requirement, is that the tag can be self-timed. The tag would harvest power and only transmit when it has accumulated enough energy. This would be no longer than the time to harvest the energy to run the timer as well. Because the tag is short range, it can operate more often without concern for collisions of asynchronous tag emissions. This can get the energy harvesting requirements down to an average power of 1 nanowatt, or −90 dBm for the case of 5 beacon-like pulses, each 500 us long, recurring every 10 sec, thus being low enough power requirements to operate off of stray RF signals in the environment.

The time it takes harvested energy to accumulate to the full value required for transmitting is random, and in one embodiment, it is required to control the time between transmits from the tag with less randomness than a criteria for sufficient energy harvesting would provide. In one embodiment, a second threshold and timer is used so that after the power-up occurs from energy harvesting, the rate of harvesting is determined and that is to compensate the time of transmit. A second timeout starts up once the first energy threshold is crossed. This creates a variable delay that compensates for the harvesting charge time in order to make a nearly constant transmit period. Herein is an example of how these timers could be used: We want a tag to transmit every 5 sec. Let's say the $1^{st}$ charge is reached in 1 sec. The tag is unaware of this charging rate at the time the $1^{st}$ charge is reached because it was previously asleep or off. After that threshold is reached, the timer records for 1 sec and measures the new voltage compared to the previous voltage (w.r.t. the input voltage). Let's assume for discussion that the charge rate is 1 V/sec.

The assumption is that if the $2^{nd}$ Volt of charge buildup was achieved in 1 sec, then the first Volt was also achieved in 1 sec. and these would correlate on average (if a noise pulse occurs it would sometimes occur in the first charge making it go faster than the second charge time, and sometimes in the second charge making that part go faster). Thus it measures the $2^{nd}$ charge and extrapolates that result to the first charge time, to get the $2^{nd}$ charge was reached in 2 sec total, and so it waits 3 more sec to go off at the 5 sec mark. If the $2^{nd}$ charge actually took 2 sec, it would assume the first charge took 2 sec since they are set at the same differential voltage, and that it should only wait 1 sec before transmitting to get to 5 sec total. So the timer delay ranged from 1 to 3 sec corresponding to the $2^{nd}$ charge ranged from 2 to 1 sec to keep a constant 5 sec ping time.

There are at least 3 ways for the tag to measure the charge time: 1) fixed time and check the V value, 2) fixed V value and check the time (can use multiple thresholds), 3) arbitrary time and V and divide to check the slope.

An alternative embodiment to smooth out the charging time is if the charge always takes much less time than the transmit period and you just add a fixed time offset from the charge up time. So if it charges between 1 and 2 sec, but you wait 58 sec, then the transmit always occurs with a period that is between 59 and 60 sec, so 100% variation was cut down to less than 2% variation.

FIG. 9 parts A and B show exemplary embodiments of variations of beacon bursts. FIG. 9A shows a sequence of transmit power increasing where the height of the rectangular representation indicates transmit power. The sequence of power change is not relevant as the relative or absolute transmit power is indicated as data within the beacon packet. This allows the user of the mobile device receiving the signal to home in on the location based on being able to receive the lower power signal but still being able to have an expanded RF range from reception of the higher power beacon to know the tag is within the vicinity. The intermediate value beacon assists in providing more information about whether the mobile is moving closer to the tag or further away from the tag. FIG. 9 B shows a set of bursts 904 where each beacon in a burst 914, or subset of bursts is the same transmit power level so that at least one of them can be received by a mobile device. The power then changes for the next burst, 915, 916, or it may change for the next set of bursts. By reading in the received signal which power level was transmitted, the reader does not need to count beacons or bursts or know where in the sequence it is. The exemplary embodiment of power changes in the transmissions is indicated in FIG. 9A and FIG. 9B and it should be noted that other sequences can be used. The use of absolute transmit power transmitted as data in the packet allows the reader to determine relative distance to the tag when considering information from multiple transmissions and it may estimate the distance based on the absolute power level. The receive signal level can assist in determining the distance to the tag.

Figure 10:
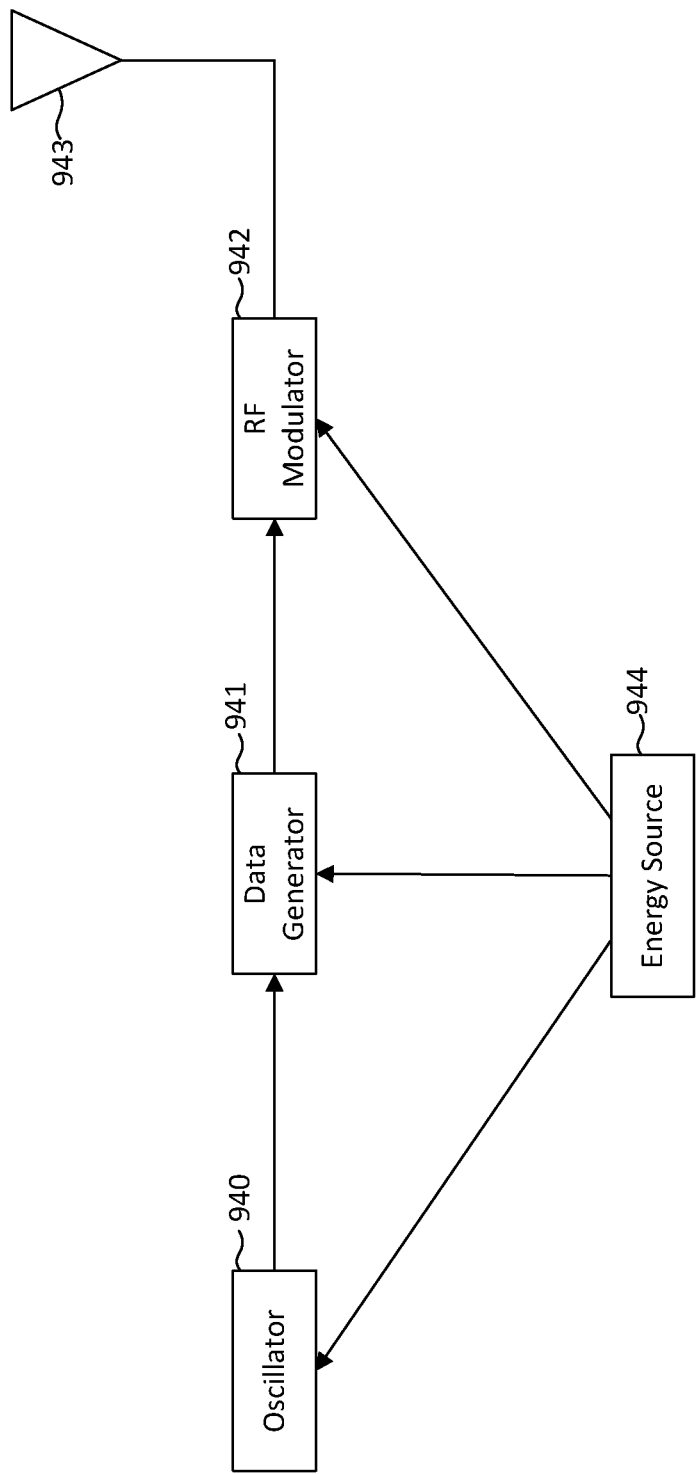
FIG. 10 shows an exemplary embodiment of a tag.

FIG. 10 shows an exemplary embodiment of a tag. At least one oscillator 940 that clocks the circuits in the data generator 941 and determines the RF carrier frequency in the RF Modulator 942. The Data Generator 941 creates the digital stream based on the information stored in the tag and if a monitor tag, the sensor information. The RF Modulator 942 turns the Data Generator 941 output into an RF signal on a channel that can be received by a mobile device. The RF Modulator output drives the Antenna 943. All active circuits in the tag must have a power source which is provided by Energy Source 944. This source may be derived from a battery, or may be harvested energy. Harvested energy may be from any of a number of different energy sources in the environment including the cell phone or Wi-Fi signals of the smartphone that will receive the tag signal, as shown in FIG. 10. Other energy sources include heat, vibration, light and other stray RF signals. Similarly, instead of the RF transmission, a near-field, ultrasonic, infrared, led signaling, video signaling, or other type of transmission may be used as long as there is a proliferation of readers that can receive the transmission.

Figure 11:
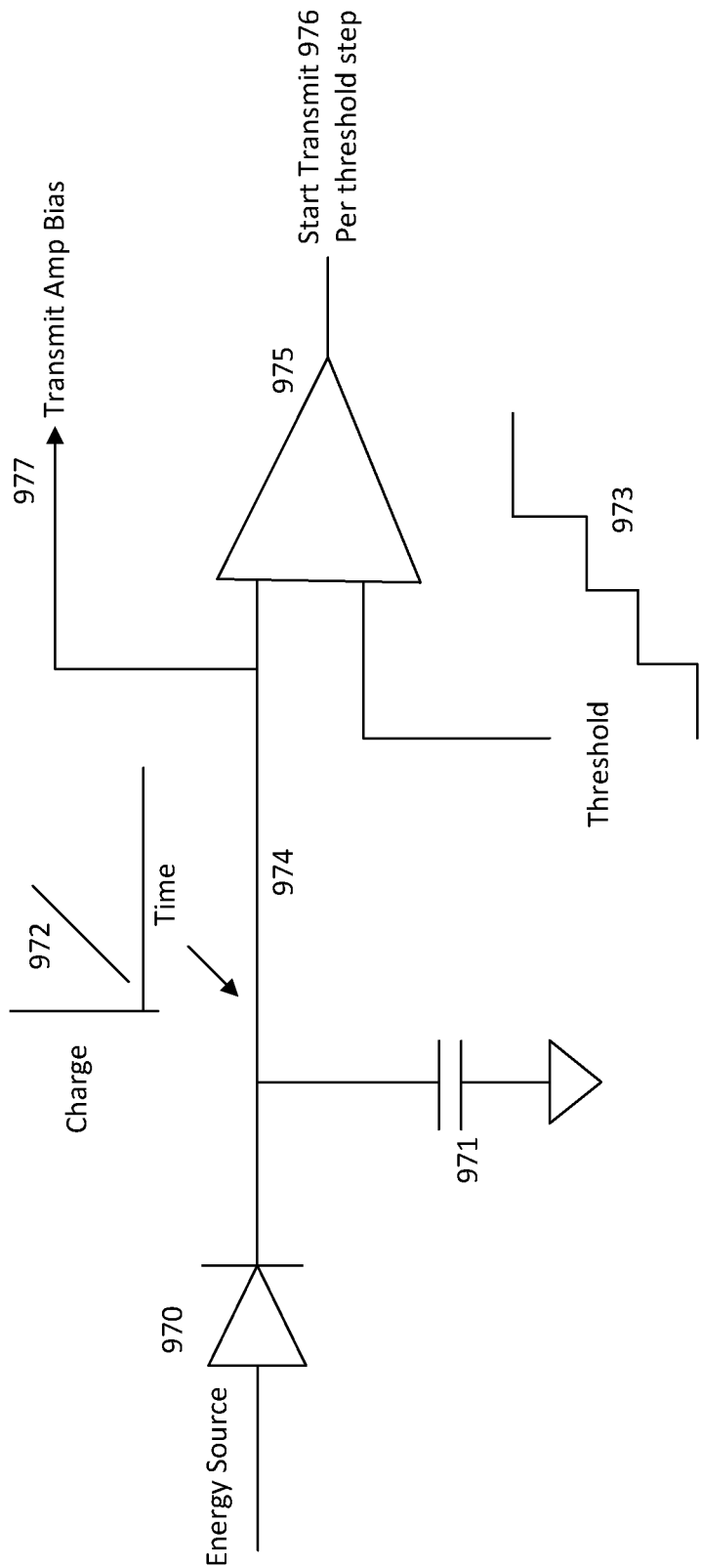
FIG. 11 shows an exemplary embodiment of an analog model of a tag charging circuit that varies the transmit power with the threshold setting for the charge level.

FIG. 11 shows an exemplary embodiment of an analog model of a tag charging circuit that varies the transmit power with the threshold setting for the charge level. It is emphasizes that this analog model could be implemented with analog circuits, digital circuits, software, or a combination as these are equivalent structures for this apparatus. The figure teaches that an energy source, which can be an onboard battery, intentional field energizing source, or one or more sources of harvested energy, where harvested energy is energy derived from stray energy in the environment that is available but not intended to have been generated to power the tag. The energy is used in a charging circuit modeled as a diode 970 and capacitor 971, but can be many forms that are known for capturing and storing energy. Plot 972 indicates that the stored energy increases over time, and although plot 972 indicates a more or less linear plot, this is only an exemplary embodiment and it is considered equivalent if the charge increases nonlinearly with time and is even non-monotonic with time. A threshold is set in the tag as indicated in 973, and threshold detector 975 asserts its output 976 when the charge level 974 exceeds the threshold 975. The assertion of threshold detector output 976 causes the transmit to occur. The charge level 974 drives the transmit amplifier for the transmitter. A higher threshold 973 will provide a higher drive to the transmit amplifier and thus more transmit power. The control of the threshold level controls the transmit power. Since the charge is a function of time, this exemplary embodiment will require enough time for the charge level to reach the set threshold to transmit so higher power transmissions may take longer to charge up to enable them. The threshold 973 is shown as a staircase but can be any set of steps, including a constant, where the step level is controlled to control the transmit power. It is not required that a tag use the model shown in FIG. 11 in order to practice the system of the present invention. This exemplary embodiment is one possibility for implementing a tag that will generate different transmit power levels.

It is also an embodiment of the present invention that there be a relative motion detection algorithm in the application or in the server. The relative motion detection determines if the mobile device is changing location by a minimum preset amount that is greater than the tag RF range and the tag is moving with it. The tag moving with the mobile device may be an indicator that the person owning the mobile device is being tracked. A tag that is attached to a person carrying the mobile device that is receiving its signal would have this characteristic. A privacy feature would block the reporting of such a tag unless explicitly allowed by a keypress or input on the mobile device. Although, it is also an embodiment to make certain classes of tags that are used for controlled operations (such as tracking people in criminal investigations) to not be subject to this override, and to have multiple levels of password enabling associated with override levels.

It is also an embodiment of the present invention that the system described is used as a game of scavenger hunt where players search for hidden tags with their phones. Points are scored based on the speed of location and value of located tag.

It is also an embodiment of the present invention that the tag IDs occur in multiple steps, whereby a first step sub-groups tags and a next step refines the sub-group, etc. Multiple addresses can be used on a tag to allow subgrouping the tags.

It is also an embodiment of the present invention that the system described operate with a limited number of users in closed system.

It is also an embodiment of the present invention that the system described includes a distributed server or a cloud server.

It is also an embodiment of the present invention that the system described includes a peer model for distributing tag information, where the peer set is connected ad hoc, as a tree, or as a mesh.

It is also an embodiment of the present invention that application running on the mobile device operates a proximity mode were it recognizes different transmit powers were used for different receptions from the same tag ID so that it can designate the location where the lowest transmit power signal was received or build a trajectory that indicates the direction of the tag.

It is also an embodiment of the present invention to have tags that receive as well as transmit. For example, you can do 2-way communication with a card-tag such that you can instruct it to latch a lock or initiate an immediate response. This may require a battery and timed wakeup, or can be field triggered or energized or energized through energy harvesting.

Figure 12:
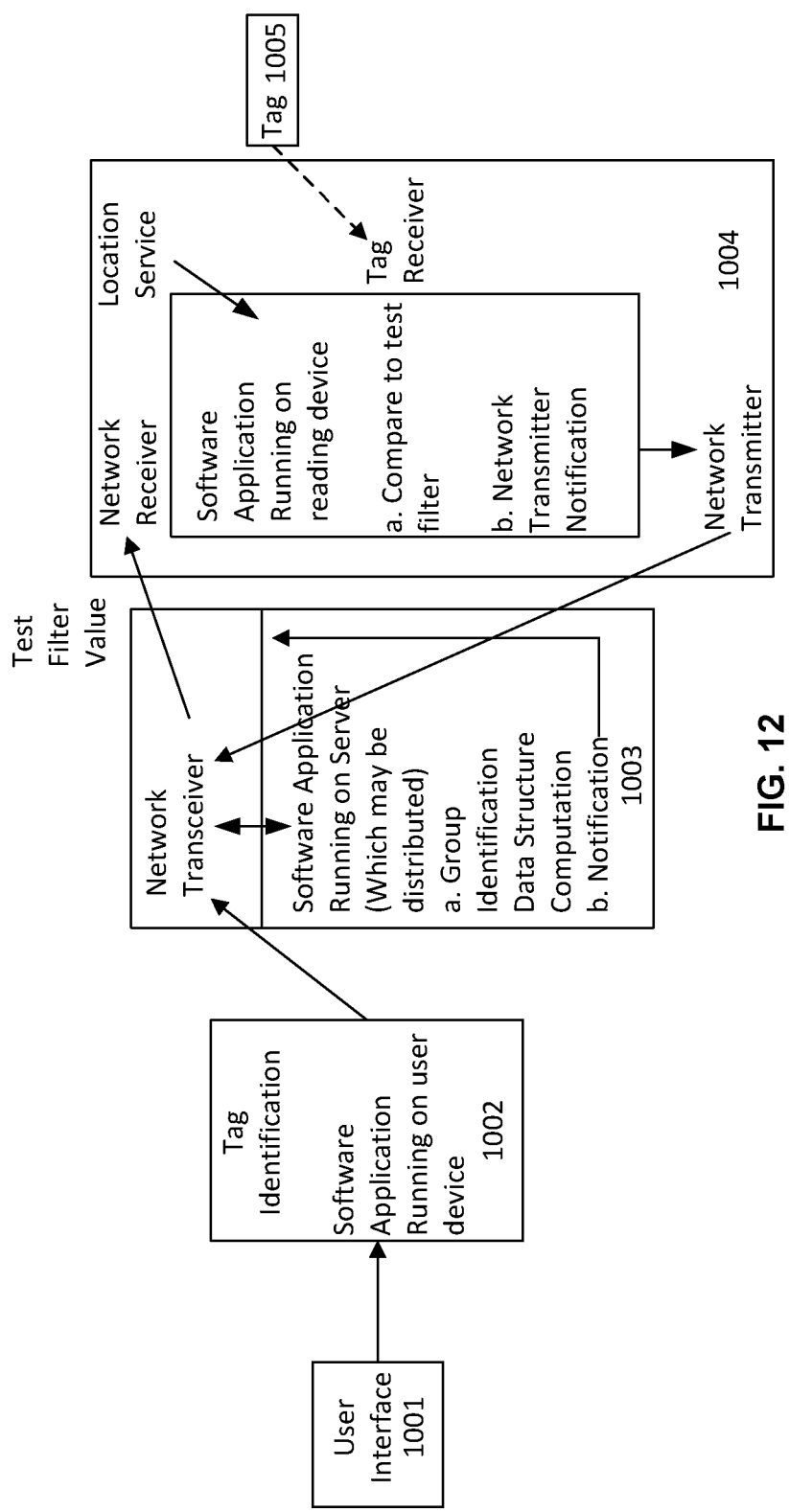
FIG. 12 shows a block diagram of parts of a system that implements the present invention

FIG. 12 shows a block diagram of an embodiment of parts of the present invention. The user 1001 uses the interface to enter the tag information of the tag they are looking for (through a reference to a photo, for example), and the software application operating on the user's device 1002 transmits the tag information to the server, which may be a cloud or distributed server 1003. The server 1003 combines the reported tag information with the other reported tag information in the group identification data-structure computation and pushes the value out to the software application on the reader devices 1004 as the test filter value. The software application on the reader device 1004 receives a tag identification value from tag 1005 and determines if that tag is likely contained in the test filter value. For example, if the test filter value is created as a Bloom filter, the software application on the reader device 1004 would generate the hash values required to test the presence of the hash results in the Bloom filter. Whereas if the test filter value is a product of prime numbers, the software application on the reader device would divide the test filter value by the prime number related to the tag identification value that is determined by a prime number association algorithm, to determine if there is a remainder. No remainder from the divisor means the tag has been identified as a reported tag. These are two exemplary embodiments of algorithms and there are many algorithms that can be used; some being permutations of these algorithms. If the filter test is passed, the software application on the reader device 1004 gets its location information from the device's location services and sends a notification back to the server 1003 over the network that contains the tag identification value and the location, along with other useful information such as the time of the detection, and in some embodiments, time coarse tracings of the information. Server 1003 compares the full tag identification value to a saved list, or a unique representation of the value to a save list of unique representations, and sends a notification if a match is confirmed.

In another embodiment, the processing algorithm of the tag ID hash and the filtering value are both updated so that the group identification data-structure computation uses the new algorithm to recalculated a new value and pushes the value out to the software application on the reader devices 1004 as the test filter value, to serve as a security feature that prevents an older algorithm from locating a tag ID in the new group identification data-structure value. By controlling which devices get the new number, only those with the new algorithm for processing the tag ID can detect the tag. This method can be used to allow and block specific readers for tag detection.

Because the transmission distance is so short and the duty cycle so low there can be high density frequency reuse whereby uncoordinated transmissions from tags on the same frequency channel are very unlikely to collide.

Energy harvesting is a known method whereby stray energy in various forms in the environment is captured and stored over a period of time for energizing the circuits. It is an embodiment of the present invention that energy in the form of RF, light, vibration, heat, or other forms of energy in the environment, can be captured and saved in an energy storage component on the tag, such as a capacitor, and when enough has been stored to pass a threshold in voltage, that the energy discharge causes the circuits in the tag to operate.

The system has been described as looking for a tag after it has been reported missing. This will be referred to as forward looking detection because the search occurs after the missing tag is known to be of interest, and new locations will be registered, whereas old reports of the tag are not saved anywhere due to the vastness of the numbers of tags that would require being saved. Another exemplary embodiment is a reverse looking system whereby the location of every tag on a small list of tag IDs is updated when that tag is seen, even if it is not reported. This requires storing the last known location for each tag on the small list. This would be a common list for all the phones in a small subgroup that then cooperatively tracks the list in real time. This embodiment can be used for small groups such as families or small businesses, such as for files in a law office. When a tag on the list is reported, the last known location is already known, and retrieved from the application. For small groups, the last known information can be saved on either the mobile device itself, or up in a server in a subgroup list. The social network to access the information is still used but the information is updated prior to the inquiry.

Figure 13:
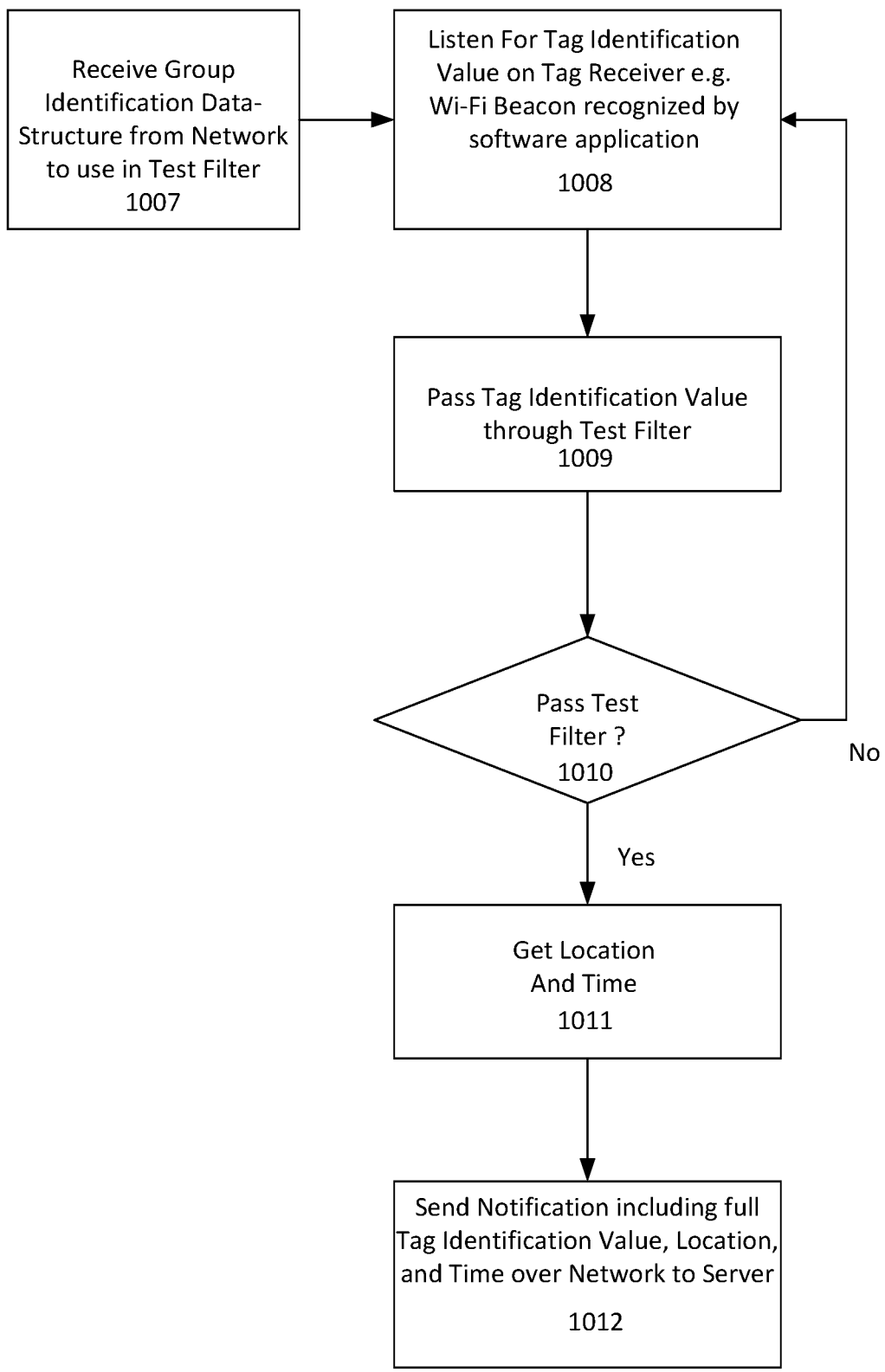
FIG. 13 shows a flowchart of an exemplary embodiment of the software application that would run on an exemplary embodiment of a reader device

FIG. 13 shows a flowchart of an exemplary embodiment of the software application that would run on an exemplary embodiment of a reader device. The software application is coupled to a network receiver 1007, which would be part of the reader device. In an exemplary embodiment, the reader device could be a smartphone and network receiver 1007 could be the LTE transceiver, the Wi-Fi transceiver, a Bluetooth transceiver, etc. The software application receives the receive. The exemplary software application would receive a Group Identification Data-Structure from the Network to use in Test Filter in 1007. It would also listen for a Tag Identification Value to be received on a Tag Receiver in 1008. An exemplary embodiment of the tag receiver would be the Wi-Fi receiver on the exemplary reader device, which would receive a Wi-Fi beacon recognized by the software application 1008. Other possibilities for a tag receiver include, but are not limited to, Bluetooth, FM, or Near Field receivers. The Tag Identification Value would be applied to the Test Filter in 1009, which is the filter that uses the Group Identification Data-Structure received from the Network. If the filter test passes in 1010, which means the tag identification value is likely ore surely (depending on the final selection of the algorithm as described herein) contained in the composition of the group identification data-structure, then the software application proceeds to collect the other information, including location and time in 1011. If the test fails, the flow goes back to 1008 to listen for another tag identification value. The condition of a passed test in 1011 then proceeds to 1012 where the exemplary software application sends a notification over the network by way of the exemplary network transceiver (e.g. LTE, Wi-Fi, Bluetooth, etc.) in the reader device to Server including full Tag Identification Value, Location, and Time 1012.

Figure 14:
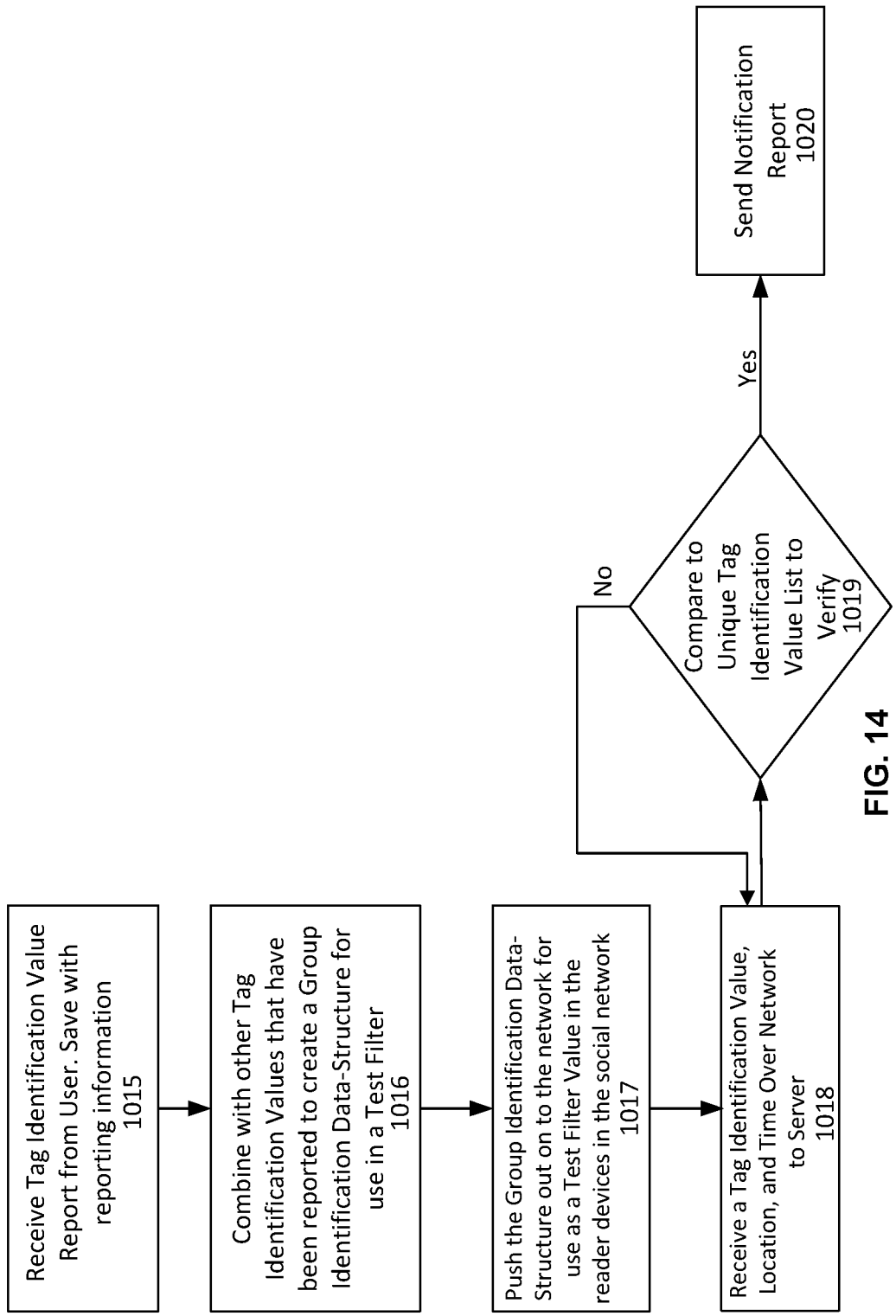
FIG. 14 shows a flowchart of an exemplary embodiment of the software application that would run on an exemplary embodiment of a server.

FIG. 14 shows a flowchart of an exemplary embodiment of the software application that would run on an exemplary embodiment of a server. A server can be a single entity, or a distributed set of entities, each contributing part of the result, or a cloud resource with unspecified and possibly changing hardware supporting it. The server function may also be implemented as a distributed software application that runs in cooperating reader devices. The exemplary embodiment in FIG. 14 shows that a Receive Tag Identification Value Report is received at the exemplary server from a User 1015. The reported tag identification value is saved along with the information the server needs to report back if the tag is found. The server needs to know if the user receives the report, a third party, or both. The server uses an algorithm for combining the information into a test filter value using an algorithm with the properties described herein. Two exemplary embodiments were given as the Bloom filter (or counting Bloom filter), where the hash calculations for the Bloom filter is calculated on each Tag Identification Value, and, a product of prime numbers where each prime number is mapped from a Tag Identification Value or hash function thereof. Other techniques can also be used, resulting in a Test Filter Value. These algorithms can be split into portions and calculated in subgroups, can be combined in different ways, and they can be optimized for specific computing technology that the software application operates on. The server combines the incoming Tag Identification Value with the Test Filter Value calculation from other Tag Identification Values that have been reported to it, to create a Group Identification Data-Structure for use in a Test Filter in 1016. The exemplary software application then pushes (although it can be pulled by the reading devices just as well) the Group Identification Data-Structure out onto the network for use as a Test Filter Value in the reader devices in the social network in 1017. The exemplary server running the exemplary embodiment of the software application receive a Tag Identification Value from a reader device and its associated Location, and Time information over the Network in 1018. The sequence of this information can be varied as a technology optimization.

) The exemplary server compares the Tag Identification Value (i.e. Tag ID) to the list of unique Tag Identification Values to Verify 1019. If the tag identification value does not pass verification the flow goes back to 1018 to wait for another tag identification value. This comparison is optional and would be used if there could be some question based on the initial Test Filter algorithm if the tag was properly identified. If, for example, a foolproof algorithm was used (for example, a prime number product algorithm with perfect calculations) then this step can be skipped. Also, the server can first verify the Tag Identification Value and then request further data about the tag from the reading device to reduce unnecessary traffic if an algorithm was used with many false positives. The tradeoff is whether the test is more accurate at the edge device or the exemplary server device. Once verified, the server would send a Notification Report 1020. The notification can go to the user, or can go to a third party, or both.

In an exemplary embodiment, the knowledge of who reported the tag is not contained in the Test Filter Value in the edge device. The edge device simply determines a tag is a tag of interest, and the report is generated at the server where the mapping and history of the original tag report is kept.

It is also an embodiment of the present invention that indoor location systems are used to locate the mobile devices in addition to GPS for outdoor location of the mobile device.

It is also an embodiment of the present invention that multiple sightings of the same tag by different mobile devices help cooperatively locate a tag.

It is also an embodiment of the present invention that sightings of one or more tags that were reported as part of a group of missing tags create a report group indicating a tag cluster that relate additional tag identification values to the report.

It is also an embodiment of the present invention that any tag transmission that a mobile device can receive may be part of this system, including tags that emit Wi-Fi, Bluetooth, iBeacon, ZigBee, or other transmissions. The application running on the mobile device simply receives beacons or other packets that announce the tag's presence and captures the tag ID and other information if available.

To prevent excessive messaging from the mobile device regarding the same tag within the same geographic location, the first time a tag ID is reported to the server with a location the server transmits a message to the reporting mobile device which prevents further transmissions into the network of that mobile device saying that it found that tag as long as the tag remains within a specified Cartesian distance based on the location coordinates. This is considered a hold on that tag ID at that specific mobile device so the same report does not recur. Low rate periodic updates of the tag in the same geographic location may also be allowed as an assurance that the tag is still there. The rate reduction of these messages can be programmed by the server in its hold message. Although there could be many tags that are under watch, there will be very few reports on these tags. Each new mobile device that is in proximity with a watched tag will send the tag ID one time and then be held from further transmissions when seeing that tag in that location. The hold can be based on a timer in the mobile device that determines when the information is stale, or it can be directed from the reader to take the tag ID off of hold.

It is also an embodiment of the present invention that the application lets the a user set a geographic boundary for a tag, and keep that tag on a watch list, such that if that tag is found by a mobile device in a location that is selected as either outside or inside of the geographic boundary, an alarm is tripped and, or, an alert is sent. A tag on the watch list is pushed out to the mobile devices (either as part of the original compressed list or hash values, or as part of a secondary compressed list and set of hash values). This embodiment would be useful as a anti-theft alarm. If tagged belongings are discovered outside of a household, the alarm would be tripped immediately upon detection instead of having to wait for a report or inquiry.

It is also an embodiment of the present invention that a tag under watch be related to a specific mobile device instead of a location. After the first report of the tag on the watch list by a mobile device the mobile device would not report the tag again until it no longer received signals from the tag for a period of time.

It is also an embodiment of the present invention that a hashed value of the tag ID is transmitted from the tag along with the full ID so that the tag stores the hash value instead of it being computed by the reader device. The hashed value would be compared through an algorithm to the hash or compressed list from the server.

It is another embodiment of the invention that instead of tags being recognized by readers, that other announcements are recognized which represent services available near a reader. I inquiry from a user on one device running the application would request an indicator when a service shows up as being available in a geographic area, and another device in that geographic area, upon receiving an indication of an available service, would relay the information to the server to be provided to the requestor. The requestor would then access the service by interacting with the device detecting the service by way of the server. The detecting device acts as a proxy for the user's device to access the service.

The present invention describes a full system that can interact with millions of tags at a time but fundamentally it is built upon an interaction with a single tag and reader, which is part of a mobile network. The invention at least is an asset tag detection system comprising:

i. A plurality of mobile, nomadic or fixed devices connected to a mobile network, each of said devices belonging to, and under the control of, a different user; and, ii. a first device of said plurality of mobile, nomadic or fixed devices running a software process that is a first software application; and, iii. a second mobile device of said plurality of mobile, nomadic or fixed devices running a software process that is a second software application; and, iv. said first mobile device sending first identification information describing a first tag over the mobile network; to a first server, which distributes said first identification information after processing through a first algorithm to said second mobile device as part of a distribution list; and, v. said first tag transmitting a first signal that can be received and demodulated by the said second mobile device; and, vi. said second mobile device receiving said first signal from said first tag; and, vii. said first signal from said first tag containing a value representative of first tag identification information describing said first tag; and, viii. said second mobile device making a first comparison of said first tag identification information received from said first tag after processing through said first algorithm to the said distribution list received from said first server to create a first result; and, ix. given an affirmative first result of the said first comparison, sending first result to first server along with first location information of said second mobile device.

x. The system also includes that the first and second software applications are the same software application.

There are some important terms, clauses and phrases used in the claims that are intended to have the lexicography as described herein.

A software application is a sequence of instructions that perform a task while being available to execute on a computing machine. On a mobile device such as a smartphone or tablet PC many applications are available for interaction with a user and some may operate in the background without user interaction. The application may have access to the hardware features of the device, including the input and output capabilities such as transmitters and receivers, clock timers, location services provided by other software, and other applications.

Two parts of a system are coupled when information or signals can pass between the parts. The coupling does not have to be direct in that there may be apparatus between the parts that are coupled that either facilitate or allow the transfer of information or signals. An example would be a software application that resides on a processor system which contains a processor and memory and the ability to an exemplary interface to a radio device or other I/O device. The software application can be coupled to the radio device and vice versa by virtue of the software application providing data to or receiving data from a driver that also resides on the processor system and the driver forming the appropriate interface signals to pass data to or get data from the exemplary interface in a format that the radio device or other I/O device can operate on.

A data-structure has a composition comprising information derived from values when the values can be operated upon with a mathematical or heuristic function or algorithm, which includes logic operations, and the results can be combined in a way that a data-structure is formed which is now composed of information related to the values. A data-structure is a value, list of values, vector, array, or group of bits with some specified format.

A network transmitter is a transmitter that can interact with a network, and is generally part of a transceiver. A network receiver is a receiver that can interact with a network, and is generally part of a transceiver. A transceiver is comprises a transmitter and a receiver. Exemplary embodiments of a network that a transceiver comprising a network transmitter and network receiver would be part of for a mobile device such as a smartphone or tablet PC would be either the cellular phone network such as the LTE network or a Wi-Fi network. Other embodiments can be used.

A tag receiver is a receiver or may be the receiving part of a transceiver that can detect, demodulate and pass on the data in the transmission from a tag. Exemplary embodiments of the tag receiver would be a Wi-Fi receiver, a Bluetooth receiver, an FM radio receiver, an optical receiver, a camera, a ultrasonic receiver an infrared receiver, a magnetic receiver, or a near field receiver. Other embodiments can be used. The tag transmission is received from said tag receiver when the received signal is coupled to the application.

A tag is an object that announces its presence. A tag may announce its presence as a result of receiving a signal, as a result of a timed transmission, or as a result of having accumulated enough energy to support a transmission. A tag may transmit more than identifying information, such as sensor information. The transmission may be radio frequency, infrared, Light emitting diode, ultrasonic, or use any wireless medium. The tag is generally attached to an object, and the user commissions the tag by recognizing the tag's ID and associating that ID to the object the tag is attached to. As an exemplary embodiment, the user may place a flat tag in their wallet, hold the tag very near the phone, and on their software application, indicate the tag being seen at short range is their wallet tag. The user could also enter the ID by hand or through other means.

A device is programmed to do something when a sequence of machine level operations are part of a sequence of steps that the device will traverse. The steps do not have to be traversed in order and can have branches and jumps.

A determination is a result of a test regarding the character of an outcome. An affirmative result would be one that passes the test.

A group identification data-structure is a combination of the information from more than one piece of identification data. The format of the structure is suitable for conveying to the application that will use it in the determination. Exemplary embodiments of the structure are a single value representing the combination of the data, a multivalued list of data, or can be a set of values that each represent different combining techniques of the data. Other embodiments for the structure can be used.

The relationship between a tag identification value and a group identification data-structure is based on a function using both as inputs. An exemplary embodiment is that the data-structure is a list and the tag value is found in the list. Another exemplary embodiment is that the data-structure is a list of hash values of tag identification values and the hash of the reported tag identification value is compared to the list of hash values. Another exemplary embodiment is that the structure is a combination of hash operations on each value of the group of values, for example, a product of the hash of each value in the group, and the function that provides the relationship is the division of the product by the hash of the tag value. Other embodiments for the relationship, the function, and the preparation can be used.

The tag identification value being part of the composition of the group identification data-structure means that an operation that is a function of both of these inputs provides an output that is affirmative. As exemplary embodiment if a group identification data-structure is a simple ordered list of identification values, the operation can be to determine if the tag identification value is among the list. Similarly, as another exemplary embodiment, if the group identification data-structure may be an ordered list of checksums of identification values and it would be determined if the checksum of the tag identification value is among the list. As another exemplary embodiment, if the group identification data-structure is a composite number, or set of composite numbers, where each composite number is derived from an operation or series of operations on a set of identification values, a function or functions of the tag identification value can be an input to the function with the composite number or numbers to determine if the composite number or numbers are likely to contain information derived from the tag identification value, and an affirmative result would mean the tag identification value is part of the composition of the group identification data-structure. As an exemplary embodiment, consider a composite number that is a product of a number of tag identification values, each of which is a whole, real number. If in an exemplary embodiment the tag identification value of interest is among the set that was multiplied together to form the product, then dividing the tag identification value of interest into the compound number will result in an answer that is also a whole number. Since many numbers that are not part the composition of the compound number product will also produce this result, this is not intended to confirm that the tag identification number of interest is certainly among the composition numbers, but it reduces the possible set size of the numbers that will pass through this filter. This simple example is purely an exemplary embodiment intended to produce understanding of the words describing the approach, and not intended to describe an effective way to filter the numbers. A better filter would be, as another exemplary embodiment, to use prime numbers representing the tag identification numbers that form the composite number, and then the set of numbers that can be factors of the composite number is only another prime number. Other embodiments can be used to determine if the tag identification is part of the composition of the group identification.

If the determination is affirmative, the application can initiate a notification transmission in which data that contains the full tag identification value is coupled to the network transmitter, which transmits the information in the data over the network.

The Network can be an LTE network, Wi-Fi network, or other, and the reader devices participating in the social network cooperating to find tags can be connected to the Network.

A location determining service provides a way of determining the location of the device that has the software application programmed on it and providing that information to the software application. A common exemplary embodiment of such a service is that a smartphone can use the Global Positioning System to determine its location. It can also use cell towers and Wi-Fi access points to assist in determining its location. The determined location is made available as part of a service provided to software applications that reside on the device.

A hash is a manipulation of a number or the digits of a number that often is used to allow fast storage and retrieval access in determining the presence of the number among a group of numbers. A hash collision is when the hash function of two different input numbers produce the same output hash value. In a more generic form a hash is a manipulation of the digits representing a value. It is an embodiment of the invention to use a hash function such that the cost of a hash collision is low, because the full input value will later be verified before assumed to be the tag identification value of interest, and the probability of the collision occurring is low, or low enough that multiple hash functions can be used in combination to make the probability of collision fall below that required for a system specification. value calculated from the unique tag identification value is calculated using one or more formula, heuristic rules, table lookup, and logic, including a combination of these, and is referred to as a hash value.

One value maps to another value when there is a correspondence between the values that can be determined either with one or more formula, heuristic rules, table lookup, or logic. The mapping need not be bidirectional, and more than one value can map into a single value.

A reader or reading device is an edge device that can be within transmission range of a tag, contains the software application, and receives the tag ID.

Discovery or discovering of the tag is the receiving of the tag ID and determining it is among the group of interest.

A boundary containment test result in relation to said first geographic boundary is a specification of where a location must be with respect to some geographic boundary designation in order for an action to take place. As an exemplary embodiment, if the geographic boundary is a closed surface designated by at least 3 points, the boundary containment test result can be either that the location is within or outside of the boundary to be a successful test. As another exemplary embodiment, if the geographic boundary is a line designated by at least two points, the boundary containment test result would say which side of the line the location is on to be successful. As a further exemplary embodiment of the line case, a possible geographic boundary could be given by longitude and latitude that specify a line running east to west, and the test could be whether the location of the reading device when reading the tag is north or south of the line.

The time noted when either the first determination is made of the tag identification value or the location services information refers to the best estimate of the time of either of those. The time that is recorded that is reasonably close to these can be used for the time noted. As stated herein, the location can be measured as a result of the determination or a location from a previous location determination can be used if it is determined the time that the location measurement previously occurred was more timely.

It should be understood that other embodiments of the same concept of using the social network to find lost or stolen goods, to monitor remote data, and to create an alarm system should be considered as other manifestations of the same invention and are within the scope of this disclosure. Also, it should be understood that other embodiments of a mobile device used to receive a tag signal, locate itself, and report its location along with the tag ID back to the initiator of the missing tag report, are other manifestations of the same invention and are within the scope of this specification.

The invention claimed is:

1. An apparatus comprising a software application coupled to a network transmitter, a network receiver, a tag receiver, and a location determining service;
   said software application programmed to make a first determination of a relationship between a first tag identification value received from said tag receiver and a first group identification data-structure received from said network receiver;
   wherein, said first group identification data-structure has a first composition comprising information derived from a plurality of composing tag identification values; and
   wherein, said software application is programmed to initiate a first notification transmission through said first network transmitter comprising said first tag identification value and a first location information received from said location determining service, if said first determination is that said first tag identification value is part of said first composition of said first group identification data-structure.

2. The apparatus of claim 1 whereby said information derived from each of said plurality of composing tag identification values is a first set of prime numbers where each prime number in said first set of prime numbers is related to a tag identification value from among said composing tag identification values;
   wherein, the said each prime number is determined by a mapping of hash values of digits of said tag identification value, and,
   said first group identification data-structure comprises an operation on said first set of prime numbers.

3. The apparatus of claim 1 whereby a precomputed hash value of said first tag identification value is stored on a tag with the tag identification value; and, said precomputed hash value is received from said tag receiver.

4. The apparatus of claim 1 whereby said information derived from each of said plurality of composing tag identification values are operated on by a Bloom filter to form said first group identification data-structure.

5. The apparatus of claim 1 whereby a first geographic boundary description and a first test condition relating to the position relative to the said first geographic boundary description is received from the network receiver and the said first notification transmission is further conditioned on said first location information received passing said first test condition.

6. The apparatus of claim 1 whereby a time service is an input and the said first notification transmission includes a first time noted when a first location services information was received from said location determining service, and a second time noted when said first determination was made.

7. The apparatus of claim 6 whereby a location-difference determination is made that said first tag identification value received and associated with said first location services information and that said first tag identification value is received again with a different second location services information, where the difference between the first and second location services information is greater than the radiofrequency (RF) range of a first tag, that the application will refrain from automatically sending a packet with the second location services information.

8. The system of claim 1 whereby, said application saves in memory a list of tag identification information for a plurality of tags, and a last known value of the first location services information associated with each of said plurality of tags.

9. The apparatus of claim 1 whereby said first determination causes multiple repeated receptions of said first location information and operates on said multiple repeated receptions of said first location information to provide an updated first location information.

10. The apparatus of claim 1 whereby repeated instances of said first notification transmission is disabled if repeated said first location information received of a same repeated first tag identification value received is less than a difference related to a radiofrequency (RF) range of a first tag.

11. An apparatus comprising a software application coupled to a network;
    said software application programmed to compute a first group identification data-structure;
    wherein, said first group identification data-structure has a first composition comprising information derived from a plurality of composing tag identification values;
    and, wherein said software application saves to memory said set of composing tag identification values used to compute said group identification data-structure and a first set of corresponding reporting requirements for each composing tag identification value of said composing tag identification values;
    and, said software application is coupled to a transmitter configured to transmit said first group identification data-structure to the network;
    and, said software application is coupled to a receiver configured to receive a first tag identification value and first location information from the network;
    and, said software application is configured to make a first determination if said tag identification value is among said composing tag identification values;
    and, said software application causes a transmit of a first notification if said first determination is that said tag identification value is among said identification values,
    wherein, said first notification comprises information determined by said first set of corresponding reporting requirements.

12. The apparatus of claim 11 whereby the software application is distributed among one or more devices that are coupled to a tag receiver.

13. The apparatus of claim 11 whereby said first group identification data-structure has a composition comprised of products of prime numbers; wherein, the prime numbers are chosen as a mapping of hash values of the digits of each tag identification value.

14. The apparatus of claim 11 whereby the hash-based algorithm used to create said first group identification data-structure is a Bloom filter.

15. A transmitting tag apparatus comprising a transmitter circuit capable of at least two transmit power levels, an energy gathering and storage circuit, and a comparison circuit that makes a first determination if said energy storage value reaches a level that is greater than a first stored-energy threshold and a second determination if said energy storage value reaches a level that is greater than a second stored-energy threshold, said second stored-energy threshold selected to be higher than said first stored-energy threshold;
    wherein, said transmitter is configured to transmit a first packet of data on a carrier frequency at a first transmit power level if said first determination is true and is configured to transmit a second packet of data on a carrier frequency at a second transmit power level if said second determination is true;
    said first packet of data comprising:
    a tag identification value;
    and, a value representing the first transmit power level;

said second packet of data comprising:
said tag identification value;
and, a value representing the second transmit power level;
said first and second packet configured to be received by a tag receiving circuit which will make a determination if said tag identification value is part of a first composition of a first group identification data-structure;
wherein, said first group identification data-structure has a first composition comprising information derived from a plurality of composing tag identification values.

16. The tag of claim 15 further including a delay timer that starts based on said first determination and only allows the first packet to be transmitted if said second determination does not become true after a first time period indicated by said delay timer.

17. The tag of claim 15 further including a circuit that prevents transmission of said first packet of data after said first determination becomes true until after said second determination has become true.

18. The tag of claim 15 wherein said tag identification value comprises said unique tag identification value and a hash value related to said unique tag identification value.

* * * * *